United States Patent
Kuroyanagi et al.

(10) Patent No.: US 7,809,089 B2
(45) Date of Patent: Oct. 5, 2010

(54) DECORRELATING DISCRIMINATION SYSTEM OF CODE DIVISION MULTIPLE ACCESS SIGNALS

(75) Inventors: Noriyoshi Kuroyanagi, Higashiyamato (JP); Naoki Suehiro, Tsukuba (JP); Kohei Otake, Suginami-ku (JP); Shinya Matsufuji, Ube (JP); Satoru Ozawa, Hino (JP); Mitsuhiro Tomita, Machida (JP)

(73) Assignee: University of Tsukuba, Ibaraki (JP)

( * ) Notice: Subject to any disclaimer, the term of this patent is extended or adjusted under 35 U.S.C. 154(b) by 689 days.

(21) Appl. No.: 10/592,557

(22) PCT Filed: Mar. 10, 2005

(86) PCT No.: PCT/JP2005/004708

§ 371 (c)(1),
(2), (4) Date: Sep. 12, 2006

(87) PCT Pub. No.: WO2005/088856

PCT Pub. Date: Sep. 22, 2005

(65) Prior Publication Data

US 2008/0232327 A1    Sep. 25, 2008

(30) Foreign Application Priority Data

Mar. 12, 2004    (JP) .............................. 2004-114769

(51) Int. Cl.
H03D 3/00    (2006.01)

(52) U.S. Cl. ...................... 375/335; 375/142; 375/144; 375/149; 375/343; 370/335; 370/342

(58) Field of Classification Search .................. 375/142, 375/150, 325, 343, 347, 349; 708/5, 422, 708/426, 813, 212; 370/335, 342, 441; 455/414.2, 455/439, 463, 336, 134

See application file for complete search history.

(56) References Cited

U.S. PATENT DOCUMENTS

| | | | |
|---|---|---|---|
| 7,116,726 B2 * | 10/2006 | Winkler | 375/296 |
| 7,400,608 B2 * | 7/2008 | Papasakellariou et al. | 370/335 |
| 7,623,571 B2 * | 11/2009 | Petre et al. | 375/229 |

FOREIGN PATENT DOCUMENTS

| | | |
|---|---|---|
| JP | 59-163514 | 9/1984 |
| JP | 61-010736 | 1/1986 |
| JP | 2003/531513 | 10/2003 |
| WO | WO 03/101012 | 12/2003 |

* cited by examiner

*Primary Examiner*—David C Payne
*Assistant Examiner*—Rahel Guarino
(74) *Attorney, Agent, or Firm*—H. Henry Koda; William L. Androlia

(57) ABSTRACT

A de-correlating discriminating system of code division multiple access signals including a system structure composed of a plurality of cells, each of the plurality of cells including a base-station and a plurality of user-stations, each of the user-stations including a user-transmitter and a user-receiver, communicating through a multi-access channel with the base station which includes a base-station receiver and a base-station transmitter, and the user-transmitter is capable of transmitting a data symbol to convey a data with a spreading sequence and a pilot symbol that is the spreading sequence to identify a channel from the user transmitter to the base-station receiver and the base-station receiver includes a minimum means square error detector to analyze an input vector that is a received signal containing both multiple users specific data responses.

12 Claims, 18 Drawing Sheets

(b)

(a)

(c)

DECORRELATING DISCRIMINATION SYSTEM OF CODE DIVISION MULTIPLE ACCESS SIGNALS

TECHNICAL FIELD

The present invention relates to a code division multiple access communications system (CDMA) using spread-spectrum modulation which can reduce white noise admixed in a transmission process and interfering noise generated in a multi-user signal separation process by a receiver, can enhance the frequency-utilization-efficiency, and can reduce a power-bandwidth-product. In this case, the modulation/demodulation technology for a transceiver of a mobile communications system where the spread-spectrum modulation is applied to BPSK signals is taken as an example to explain user-separating techniques for a multi-user receiver.

BACKGROUND ART

Spread-spectrum communications is a system using spreading modulation technology where spreading-sequences are modulated by transmit-data. Due to this spreading modulation, a data-sequence spectrum having a relatively narrow bandwidth is spread to a wide frequency-band, producing a spread spectrum signal to be transmitted. In a region (cell or sector) where a base-station (BS) provides communications services, there are users of a plurality of user-stations (hereafter called users). Such a communications system is excellent in that a low transmission power per unit frequency is consumed, disturbance to other communications can be kept at a relatively low level, and the system has inherently strong resistance to jumming noise (AWGN) mixed in a transmission process and inter-station-interference-noise incoming from mobile stations other than a desired station, namely interfering stations. However, since communications from a large number of stations share the same time-slot and the same frequency band, there is a problem in which an increase in the number of users to be accommodated per unit band is impeded by the inter-station-interference(-noise). That is to say, disturbance caused by such noise decreases frequency-utilization-efficiency and increases required transmit-power.

FIG. 16 is a block diagram illustrating the general construction of a mobile communications system which performs direct-sequence spread-spectrum (DS-SS) communications via a radio communications channel. Here, a transmitter $TX_k$ of the k-th user $u_k$ (k=1, 2, ... K) among K users in a cell modulates a radio-band carrier-wave with binary transmit-data $b_k$ to obtain a Binary Phase Shift Keying (BPSK) symbol $s_{kBP}$, and modulates the k-th spreading-sequence $g_k$ among K sequences allocated to K users with BPSK symbol $s_{kBP}$ to produce a spread spectrum symbol $s_k$. (symbol denotes a time limited signal conveying data) Thereafter, $s_k$ is transmitted through a radio communications channel. In order to discriminate the addresses of the K users, pseudo-noise (PN) sequences each of which is different from one another are used as the k-th sequence $g_k$.

A receiver RX receives through an antenna a receive-symbol r which includes, as the components, spread-spectrum-modulated symbol received from all the users, and demodulates receive-symbol r by a local carrier-wave $f_0(=f_0)$ to obtain a base-band symbol $r_{BB}$. Receiver RX applies the base-band symbol to a matched filter $MF_k$ matched to the k-th spreading-sequence $g_k$ to generate a soft-output $\hat{b}_k$ as the k-th soft-output. Soft-output $\hat{b}_k$ is compared with a threshold value by a hard decision circuit DEC to obtain the k-th detected value of binary data $\tilde{b}_k$ (the k-th means that the data has been sent from the k-th user) (This matched filter detection is called "correlative detection").

Detected data $\tilde{b}_k$ is applied to a synchronizing circuit SYNC. A generating timing of the spreading-sequence is controlled so as to be synchronized with the carrier phase and the component of the k-th user specific received symbol component contained in receive-signal r. In TX and RX in FIG. 16, the arrangement of sequential order of multiplying functions of carrier-wave $f_C(\hat{f}_C)$ and spreading sequence $g_k$ are often exchanged each other. However, the overall modulation and demodulation-functions remain the same, and any configuration may be used.

The above-described receiver uses a reception system where different respective matched filters to detect corresponding user symbols are arranged in parallel. In this system, a cross-correlation between the k-th sequence $g_k$ allocated to a user and the k'-th (different) sequence $g_{k'}(k \ne k')$ allocated to another user cannot be designed to be kept at a sufficiently low level, when the number K of users increase. A pilot-response $p_k$ is influenced by a multipath channel gain between transceivers in addition to the spreading sequence, and an inter-user cross-correlation between a pair of such pilot responses takes a larger value than the correlation between the corresponding spreading-sequences themselves. Furthermore, the multipath delayed waves of an adjacent symbol generate an inter-symbol interference (ISI), which impedes an increase in the number K of users. Hance, it is impossible to improve the frequency-utilization-efficiency.

In order to suppress disturbance caused by the above-described interfering noise, many methods for multi-user receivers which perform user separation and adjacent symbol separation by solving decorrelating equations have been studied. However, a sufficient noise suppression effect has not been obtained. Here, a list of seven preceding techniques closely related to the present invention is shown below.

(A) [Mamoru Sawahashi, Yoshinori Miki, Hidehiro Andoh and Kenichi Higuchi, Pilot Symbol-Assisted Coherent Multistage Interface Canceller Using Recursive Channel Estimation for DS-CDMA Mobile Radio" IEICE Trans. Commun., Vol.E79-B, No. 9, pp. 1262 to 1270, (09.1996)]

(B) [Mitsuhiro Tomita, Noriyoshi Kuroyanagi, Satoru Ozawa and Naoki Suchiro, "Error rate performance improvement for a de-correlating CDMA receiver by introducing additional dummy pilot response", PIMRC '02, Lisbon (09.2002)]

(C-1) [D. Koulakiotis and A. H. Aghvami, CTR, King's Collage, University of London "Data Detection Techniques for DS-CDMA Mobile Systems: A Review", IEEE Personal Comm., pp. 24 to 34, June 2000]

(C-2) [T. Abe and T. Matsumoto, "Space-Time Turbo Equalization and Symbol Detection in Frequency Selective MIMO Channels with Unknown Interference", Proc. WPMC '01, Aalborg Denmark (09.2001)]

(D) [Siavash M. Alamouti "A Simple Transmit Diversity Technique for Wireless Communications" IEEE JSAC, Vol. 16, No. 8 (10.1998)]

(E) [Naoki Seuhiro, Noriyoshi Kuroyanagi, Toshiaki Imoto and Shinya Matsufuji, "Very Efficient Frequency Usage Systems using Convolutional Spread Time Signals Based on Complete Complementary Code", PIMRC '2000, (09.2000)]

(F) [Jiangzhou Wang and Jun Chen "Performance of Wideband CDMA Systems with Complex Spreading and Imperfect Channel Estimation" IEEE JSAC Vol. 19, No. 1, (01.2001)]

System (A) intends to upgrade the function of the k-th matched filter $MF_k$ to detect a data of the k-th user $u_k$ in the system explained with FIG. 16, and uses a receiver equipped with interference cancellers shown in FIG. 17. In an interference canceller IC-1 (the first stage), a matched filter bank MFB generates estimated transmit-data (soft-outputs) $\tilde{b}_{[k]}$ of all the users except that of the (k1)-th user by using a received input $r^1$ and a pilot-response supplied from a pilot response memory PRM. By using soft-outputs $\tilde{b}_{[k]}$, the first interference generator I-GEN$_1$ generates a replica (pseudo input) $\Phi_{[k]}$. By subtracting $\Phi_{[k]}$ from input $r^1$, interference canceller IC-1 generates a soft-output $\tilde{b}_{k1}$. By making a hard decision on soft-output $\tilde{b}_{k1}$, is obtained a detected value $\hat{b}_{k1}$, with which a corresponding replica $\Phi_{k1}$ is generated with the second interference generator I-GEN$_2$. To a canceller (called the second stage) IC-2, is applied an input $r^2$ which is made by subtracting replica $\Phi_{k1}$ from received input $r^1$. Canceller IC-2 repeats to apply the same operation to input $r^2$ as that IC-1 has done. In this method, due to existence of large cross-correlations between pilot-responses of respective users, large interference components resultantly remain in the soft-outputs. For this reason, an error rate cannot be sufficiently reduced.

FIG. 18 shows a functional block diagram of a multi-user receiver. FIG. 18(a) shows a De-correlating Detector (system DD) corresponding to System (B). In this case, each user transmitter transmits a pilot symbol, so as not to be disturbed by interfering waves from the other users. The receiver receives these pilot symbols and always prepares highly accurate pilot-responses from all the users in a pilot response memory PRM. Each user transmitter uses both a sequence allocated to the user, and a common carrier-wave used by all the users to generate a transmit-data-symbol to be transmitted by the transmitter. More specifically, in System (B), each user transmits a pilot-signal to a base-station (BS) so that BS can accurately recognize channel-gain-characteristics (channel) from each user to the base-station. Therefore, base-station BS can obtain a pilot-response (channel-gain-property) $p_k$ of a transmission-paths from the k(=1, 2 ..., K)-th user $u_k$. A receive-symbol r is given by the following equation:

$$r = \sum_{k=0}^{K} b_k P_k + x \quad (A\text{-}1)$$

where $b_k$ is a transmit-data of the k-th user $u_k$, and $x$ is white noise (AWGN) included in receive-symbol r. By using a pilot-response-matrix P consisting of pilot-responses $p_k$ of all the users, Eq.(A-1) is solved by a de-correlating detector (Decor) in FIG. 18 to obtain a soft-output $\tilde{b}_k = b_k + \Delta b_k$ corresponding to the transmit-data where $\Delta b_k$ is an error. This system has an advantage such that the influence of interfering waves can be completely removed.

However, in System (B), since pilot-response-matrix P is dependent on a channel gain, the regularity of matrix P often decreases, and the AWGN component is amplified in a process of solving the equation, resulting in an increase in an error $\Delta b_k$ contained in the soft-output. Therefore, the number of users K and the spreading-sequence length L must satisfy a relationship: K<<L to reduce error $\Delta b_k$. More specifically, there are problems such that the number of users to be accommodated is limited and the system is forced to have a low frequency-utilization-efficiency.

Systems (C-1) and (C-2) use a Minimum-Mean-Square-Error Detector (MMSE-D) shown in FIGS. 18(b) and 18(c). Although system MMSE-D provides a method to solve the same de-correlating equations as solved by system DD to generate soft-outputs, in order to increase the regularity of matrix P, it modifies matrix P with an additive term in the solving process. Due to the additive term, interfering noise is generated. Since the interfering noise decreases signal components contained in a receive-vector, the quality of the soft-output are degraded. System (C-2) provides a method to overcome a drawback of the MMSE-D. Consider the k-th user $u_k$ as a target user. A soft-output-vectors $\tilde{b}$ consisting of all the user components is calculated by a conventional (as the first stage) MMSE, and an estimated received input (replica) $\phi_{[k]}$ received from users except the k-th user $u_k$ is calculated from a channel matrix H composed of channel gains of all the users estimated from the pilot-response P, and a soft-output-vectors $\tilde{b}_{[k]}$ which is made by removing the k-th user's soft-output component from soft-output-vector $\tilde{b}$, The receiver calculates the second stage receive-symbol $r^k$ by removing replica $\phi_{[k]}$ that is an interference component for the k-th user $u_k$, from the first stage receive-symbol $r^1$. Symbol $r^k$ is applied to a conventional (as the second stage) MMSE, to obtain the k-th soft-output $\tilde{b}_k$. The system makes hard decision on soft-output $\tilde{b}_k$ to produce the k-th detected value $\hat{b}_k$. Since soft-output-vector $\tilde{b}_{[k]}$ does not include the k-th soft-output $\tilde{b}_k$, an interference component generated by the k-th data $b_k$ cannot be removed in this process. Therefore, since replica $\phi_{[k]}$ includes large interfering noise, an improvement in frequency efficiency is not sufficient.

System (D) deals with a single-user system where space-time coded transmission is performed on a multiple-input multiple-output (MIMO) system. In the system, by using a plurality (N) of transmit-antennae as a space axis and a plurality ($N_\tau$) of symbol slots as a time axis, N data are transmitted using $NN_\tau$ symbols to get an advanced space-time diversity effect. In order to design respective transmit-symbol sets each consisting of N symbols simultaneously to be transmitted so as to have orthogonalities each other, a transmitter multiplies the respective of N transmit-symbols of the respective combinations by respective element sequences (codewords) of an orthogonal sequence-set (code) so that a receiver easily can separate the N data from each other. An effective technique such as to apply this method to a multi-user receiver has not been established. Furthermore, in the system, since this system assumes that the channel characteristics during a time for transmitting $N_\tau$ symbols are invariant, a sufficient diversity effect on the time axis cannot be obtained.

System (E) utilizes such a characteristic that complementary sequences have orthogonalities at all shift positions. A user of this system produces a synthesized transmit-symbol by adding plural element sub-symbols, each is made so as to multiply one of the sequentially chip shifted complementary sequences by transmit-data and transmits the synthesized transmit-symbol. Since this system can transmit a large number of element sub-symbols over a symbol period, frequency-utilization-efficiency is improved. Furthermore, the receiver can easily separate and discriminate the plural data carried on sub-symbols because the shifted sequences are orthogonal each other. However, since a sum of a large number of the element sub-symbols is transmitted, there is a problem such that a peak transmit-power considerably increases.

System (F) is a pilot-data multiplexed transmission system standardized as one of the 3$^{rd}$ Generation systems in which a user transmits simultaneously a pilot-symbol and a data-symbol. In order to separate a data and a pilot at a receiver, this system sets a real number as data (b∈±1) and an imaginary number a pilot (p=j). The same spreading-sequence is modulated by a complex number (b+j) to make a transmit-symbol. More specifically, since an 1-bit data/symbol is transmitted by using a symbol time slot and a band-width in which a 2-bit/symbol can be transmitted by QPSK (4-phase shift keying modulation), the pilot consumes considerably large resources equal to that the data dose. Furthermore, since a pilot is subjected to interferences by both a data symbol from the same user and pilot/data-symbols from the other users due to the multi-path channel characteristics, there is also a problem such that an accurate pilot-response cannot be easily obtained.

DISCLOSURE OF THE INVENTION

The present invention has been made to overcome disadvantages which conventional user signal separating functions of multi-user receivers have. As the conventional techniques, the interference canceller, the de-correlating detector, and the minimum-mean-square-error detector have been examined. The object of this invention is to provide design techniques of new multi-user receivers, and thereby to realize considerably more enhanced performance than that of the above described conventional systems with respect to a power-bandwidth-product required for 1-bit transmission that is an evaluation measure of performance of CDMA systems.

In order to achieve the above object, according to an invention described in claim 1, there is provided a decorrelating discrimination system of code division multiple access signals, wherein a basic system structure is composed of plurality of cells, each of the plurality of cells comprises a base-station and K user-stations, each of the user-stations including a user transmitter and a user receiver, communicating through a multi-access-channel with the base-station which includes a base-station receiver and a base-station transmitter, and the user transmitter is capable of transmitting a data symbol to convey a data with a spreading sequence, and a pilot-symbol that is the spreading sequence to identify a channel from the user transmitter to the base-station receiver, and the base-station receiver includes a minimum mean square error detector to analyze an input vector, that is a receive-symbol containing both multiple user specific data responses, each having conveyed a transmit-data through a channel, in a way such that the minimum mean square error detector solves a system of linear equations with multiple unknowns made for the input vector, composed of a user separating matrix U consisting of a pilot matrix associated with the channels and a white noise power multiplied identity matrix, and an unknown data vector, characterized in that the receiver comprises: means for solving a system of equations as identified by the first system of decorrelating equations with a user separating matrix $U^0$ to produce a soft-output vector $\hat{b}^0$ at an analyzing circuit, means for producing a variance of user-corresponding noise evaluation vectors of a noise evaluation matrix C generated by a matrix inverse of the user-separating matrix U as a correct solution measure $P_C^0$ consisting of K components at a power estimator, means for deciding one soft-output component $\hat{b}_{k'}^0$ of the soft-output-vector $\hat{b}^0$ as the first best user $u_{k'}$ based on one of the minimum candidate components of the correct solution measure $P_C^0$ at a best user decision circuit, means for making a hard decision on the soft-output $\hat{b}_{k'}^0$ to obtain a detected value $\check{b}_{k'}^0$ at a decision circuit, means for removing components corresponding to the first best user $u_{k'}$ from the first system of decorrelating equations with the user separating matrix $U^0$ with circuits of a modulator, a subtractor, and a best user remover to generate a system of equations as identified by the second system of decorrelating equations with a user separating matrix $U^1$, means for solving the second system to produce a soft-output vector $\hat{b}^1$, producing a variance of user-corresponding noise evaluation vectors of a noise evaluation matrix C generated by a matrix inverse of the user separating matrix $U^1$ as a correct solution measure $P_C^1$ consisting of (K−1) components, and deciding one output $\hat{b}_{k''}^1$ of the soft-outputs of the soft-output-vector $\hat{b}^1$ as the second best user $u_{k''}$ based on one of the minimum candidate components of the correct solution measure $P_C^1$, means for making a hard decision on the soft-output $\hat{b}_{k''}^1$ to obtain a detected value $\check{b}_{k''}^1$, means for sequentially repeating the same method as that applied to the second system of decorrelating equations to the following systems of decorrelating equations, to decide the following best users, thereby producing the best users in turn, and means for making hard decision on soft-outputs of the best users to obtain detected values of transmit-data all the users have sent out at the decision circuit.

According to an invention described in claim 2, there is provided a decorrelating discrimination system of code division multiple access signals, according to claim 1, characterized in that the receiver comprises: means for solving a system of equations as identified by the first system of decorrelating equations with a user separating matrix $U^0$ to produce a soft-output vector $\hat{b}^0$ at an analyzing circuit, means for producing the variance of user-corresponding noise evaluation vectors $P_C^0$ consisting of K components at a power estimator, obtaining input noise power $N_{r0}$ at a noise power estimator, and calculating a standard deviation $\sigma^0$ to compose an error amplitude distribution with the variance $P_C^0$ and the input noise power $N_{r0}$, means for obtaining a ratio identified by the 0-th normalized probability ratio $\lambda^0$ consisting of K components that is calculated based on an error distribution model with the standard deviation $\sigma^0$ and the K components of the soft-output vector $\hat{b}_0$, means for deciding one soft-output component $\hat{b}_{k'}^0$ of the soft-output-vector $\hat{b}^0$ as the first best user $u_{k'}$ based on one of the maximum candidate components of normalized probability ratio $\lambda^0$ at a best user decision circuit, means for making a hard decision on the soft-output $\hat{b}_{k'}^0$ to obtain a detected value $\check{b}_{k'}^0$ at a decision circuit, means for removing components corresponding to the first best user $u_{k'}$ from the first system of decorrelating equations with the user separating matrix $U^0$ according to claim 1, means for sequentially repeating the same method as that applied to the first system of decorrelating equations to the following systems of decorrelating equations, according to claim 1, and means for making hard decision on soft-outputs of the best users to obtain detected values of transmit-data all the users have sent out at the decision circuit.

According to an invention described in claim 3, there is provided a decorrelating discrimination system of code division multiple access signals, wherein a basic system structure is composed of plurality of cells, each of the plurality of cells comprises a base-station and K user-stations, each of the user-stations including a user transmitter and a user receiver, communicating through a multi-access-channel with the base-station in the cell which includes a base-station receiver and a base-station transmitter, and a user transmitter is capable of transmitting a data symbol to convey a data with a spreading sequence, and a pilot-symbol that is the spreading sequence to identify a channel from the user transmitter to the base-station receiver, and the base-station receiver includes a minimum mean square error detector to analyze an input vector, that is a receive-symbol containing both multiple user specific data responses, each having conveyed a transmit-data through a channel, in a way such that the minimum mean square error detector solves a system of linear equations with multiple unknowns made for the input vector, composed of a user separating matrix U consisting of a pilot matrix associated with the channels and a white noise power multiplied identity matrix, and an unknown data vector, characterized in that the receiver comprises: means for solving a system of equations as identified by the first system of decorrelating equations with a user separating matrix $U^0$ identified by the 0-th user separating matrix to produce a soft-output vector $\tilde{b}^0$ identified by the 0-th soft-output vector at an analyzing circuit, means for multiplying the 0-th soft-output-vector $\tilde{b}^0$ by a matrix inverse of the 0-th user-separating matrix $U^0$ to calculate an interference-correcting vector $c^0$ identified by the 0-th interference-correcting vector at an interference generator, and adding the 0-th interference-correcting vector $c^0$ to the 0-th soft-output-vector $\tilde{b}^0$ to produce a soft-output-vector $\tilde{b}^1$ identified by the first soft-output-vector, means for applying the same method to calculate an interference-correcting vector $c^1$ identified by the first interference-correcting vector using the first soft-output-vector $\tilde{b}^1$ as that used for calculating 0-th interference-correcting vector $c^0$, means for applying and makes hard decisions on respective components of a soft-output-vector $\tilde{b}^n$ of the n-th stage calculated by repeating a method of adding the first interference-correcting vector $c^1$ the 0-th soft-output-vector $\tilde{b}^0$ to produce a soft-output vector $\tilde{b}^2$ identified by the second soft-output vector, means for n times repeating the same method as that applied to obtain the second soft-output vector $\tilde{b}^2$ to produce the n-th soft-output $\tilde{b}^n$, and means for making hard decision on soft-outputs of the n-th soft-output $\tilde{b}^n$ to obtain detected values of transmit-data all the users have sent out at the decision circuit.

According to an invention described in claim 4, there is provided a decorrelating discrimination system of code division multiple access signals, according to claim 3, characterized in that the receiver comprises: means for introducing a coefficient $\lambda_N$ to increase an amplitude of the identity matrix, used in the user-separating matrix U, and producing a system of decorrelating equations with a user-separating matrix U modified the coefficient $\lambda_N$, means for limiting the amplitude of the soft-output-vector $\tilde{b}^0$ of the 0-th stage calculated as a solution the system to produce a modified soft-output vector, generating an interference-correcting vector $c^0$ of the 0-th stage by multiplying the modified soft-out vector by a matrix inverse of the user-separating matrix U, soft-out vector, means for adding a vector obtained by multiplying the interference-correcting output $c^0$ by an interference power estimated coefficient $\theta$ to the soft-output-vector $\tilde{b}^0$ of the 0-th stage to generate a soft-output $\tilde{b}^1$ of the first stage, means for repeating the same method to the following stages to obtain a soft-output-vector $\tilde{b}^n$ of the n-th stage, and, means for making hard decision on soft-outputs of the n-th soft-output $\tilde{b}^n$ to obtain detected values of transmit-data all the users have sent out at the decision circuit.

According to an invention described in claim 5, there is provided a decorrelating discrimination system of code division multiple access signals, according to claim 1 or 3, characterized in that the receiver comprises: means for receiving pilot-response-vectors received from respective user transmitters and separating each of them as a main response of a current pilot-symbol arrived on a target symbol-period and delayed wave responses of preceding pilot-symbols arrived on the same target symbol-period, and producing a pilot-response-set for each user, consisting of synthesized pilot-responses made by taking an algebraic sum of the main response and the delayed wave responses, means for generating a pilot-response-matrix P composed of the synthesized pilot-responses of all the users, generating a system of decorrelating equations with a user-separating matrix U made by the pilot-response-matrix P and an identity matrix, an unknown data-vector b, and receive-symbol-vector r as constituent elements, and solving the system according to a method of claim 1 or 3 to obtain a soft-output-vector.

According to an invention described in claim 6, there is provided a decorrelating discrimination system of code division multiple access signals, according to claim 1 or 3, characterized in that, the basic system comprising: means for including a multiple-input multiple-output system in which a plurality of antennae are arranged to perform communications, each of the user transmitters comprising: means for allocating a plurality ($N_d$) of transmit-data to $N_\tau N$ symbols on a space-time transmit-axis constituted by a plurality ($N_\tau$) time slots and a plurality (N) of transmit-antennae, and transmitting $N_\tau N$ symbols over $N_\tau$ symbol periods, and the base-station receiver comprising: means for receiving symbols over $N_\tau$ symbol slots at a plurality (M) of antennae, storing a pilot-response $P_{d\tau nm}{}^k$ of a pilot-symbol received at the m-th receive-antenna when the k-th user transmitter sends d-th transmit-pilot-symbol of $N_d$ symbols over the $\tau$-th symbol-slot of N, symbol-slots, generating a concatenated pilot-response-vector $P_d{}^k$ made by concatenating only pilot-responses $p_{d\tau nm}{}^K$ corresponding to the d-th pilot-responses with respect to antenna number m and time-sequence numbers $\tau$, generating a pilot-response-matrix P consisting of these vectors, and generating a concatenated receive-vector r made by concatenating of M pieces of receive-symbol-vectors received on the $N_\tau$ symbol slots, means for generating a system of decorrelating equations with a user-separating matrix U generated from the pilot-response-matrix P and an identity matrix, the concatenated receive-vector r, and an unknown-data-vector b, means for solving the system of decorrelating equations according to claim 1 or 3 to obtain a soft-output vector $\tilde{b}$ of the transmit-data-vector b, and making $\tilde{b}$ hard decisions on respective components of the soft-output-vector $\tilde{b}$ to obtain a detected data vector $\hat{b}$.

According to an invention described in claim 7, there is provided a decorrelating discrimination system of code division multiple access signals, according to claim 6, characterized in that each of the user transmitters comprises: means for interleaving in advance a time sequence of N transmit-symbols where N is the number of transmit-antennae, and transmiting interleaved symbols over $N_\tau$ times, and the receiver comprises: means for performing deinterleaving M pieces of receive-symbols where M is equal to the number of receive-antennae, means for generating a system of decorrelating equations for each of $N_\tau$ symbol sets made by deinterleaved outputs, solving the system to obtain a soft-output-vector $\tilde{b}$ of a transmit-data-vector b according to claim 6, and making hard decisions on respective elements of the soft-output-vector $\tilde{b}$ to obtain a detected data-vector $\hat{b}$.

According to an invention described in claim 8, there is provided a decorrelating discrimination system of code division multiple access signals according to claim 1 or 3, wherein a basic system structure is composed of plurality of cells, each of the plurality of cells comprises a base-station and K user-stations, each of the user-stations including a user transmitter and a user receiver, communicating through a multi-access-channel with the base-station which includes a base-station receiver and a base-station transmitter, and characterized in that the user transmitter comprises: means for transmitting a data symbol to convey a data with a spreading sequence, and a pilot-symbol that is the spreading sequence to identify a channel from the user transmitter to the base-station receiver, means for generating an enveloped cyclically shifted spreading-sequence made by adding guard sequences to a core-spreading-sequence which belongs to a k-shift sequence of one pair of complete complementary spreading-sequences or a k-shift sequence of a zero correlation zone spreading-sequence as the core-spreading-sequence, means for controlling the transmit-timing so that all of user specific receive-symbol components may arrive at the base-station receiver under a synchronous or quasi-synchronous condition, and the receiver comprises: means for extracting a core-period-part of the receive-symbol as an input vector, and analyzing it with a minimum mean square detector according to a method of claim 1 or 3.

According to an invention described in claim 9, there is provided a decorrelating discrimination system of code division multiple access signals, according in any one of claims 1 to 8, characterized in that a user transmitter identified by the k-th user transmitter of K user transmitters comprises; means for generating a pilot-symbol with a guard added spreading-sequence, and preparing a pilot-symbol-sequence consisting of N symbols modulated by the k-th code-word with a code length N in an orthogonal code and transmitting the pilot-symbol-sequence so that it may arrive at the receiver together with other pilot-symbol-sequences sent out by the other user-stations under a synchronous or quasi-synchronous condition, and the base-station receiver comprises: means for receiving a pilot-response-sequence multiplexed by all of user specific pilot-responses, and applying the pilot-response-sequence to a matched filter matched to the k-th orthogonal code-word to generate a pilot-response-vector of the k-th user, and, means for producing a pilot-response-matrix P composed of pilot-response-vectors of all the K users to establish a the system of decorrelating equations used for respective claims 1 to 8.

According to an invention described in claim 10, there is provided a decorrelating discrimination system of code division multiple access signals, according to any one of claims 1 to 4, characterized in that the receiver comprises: means for solving a system of equations as identified by the first system of decorrelating equations with a decorrelating detector which is made by removing an identity matrix I from a user separating matrix U used in the minimum mean square error detector and, means for solving the following systems of decorrelating equations with decorrelating detectors.

According to an invention described in claim 11, there is provided a decorrelating discrimination system of code division multiple access signals, according claim 1 or 3, wherein the basic system comprising: means for including a multiple-input multiple-output system in which a plurality of antennae are arranged to perform communications, each of the user transmitters comprising: means for transmitting a data symbol to convey a data with a spreading sequence, and a pilot-symbol that is the spreading sequence to identify a channel from the user transmitter to the base-station receiver, and the base-station receiver comprising: means for receiving symbols over $N_r$ symbol slots at a plurality (M) of antennae, and characterized in that the receiver comprising: means for receiving M pieces of pilot-response-vectors per user obtained through M pieces of the antennae, generating an extended pilot-response-vector by concatenating the pilot-response-vectors and generating a pilot-response-matrix P by composing extended pilot-response-vectors obtained for all the users, means for generating an extended receive-vector r by concatenating all of the receive-symbols through M pieces of the antennae, stablishing a system of decorrelating equations with a user separating matrix U made by the pilot-response-matrix P and solving the system to obtain a soft-output vector according to claim 1 or 3.

According to an invention described in claim 12, there is provided a decorrelating discrimination system of code division multiple access signals, according to claim 5, characterized in that each of the user transmitters comprises: means for generating a data and a pilot-symbols with an extended sequence which is produced by adding an imitated delayed sequence to a core-spreading-sequence, so that the imitated delayed sequence is arranged outside the tail of a transmit-symbol-period that is the same time-slot as the core-spreading-sequence, and transmitting the data and the pilot-symbols so that a component corresponding to the imitated delayed sequence takes a time position overlapping a front portion of a subsequent symbol, transmitting a data-symbol and a pilot-symbol, and the receiver comprises: means for obtaining a receive-data-symbol and K user pilot-responses, and establishing a system of decorrelating equations with a user separating matrix or a pilot-response-matrix having an enhanced regularity, produced based on the receive data symbol and K user pilot-responses, and means for solving the system according to claim 5.

BRIEF DESCRIPTION OF THE DRAWINGS

FIG. 18(c) is a diagram showing a soft-output canceling minimum mean square error detector (SC-MMSE-D).

BEST MODE FOR CARRYING OUT THE INVENTION

Figure 1:
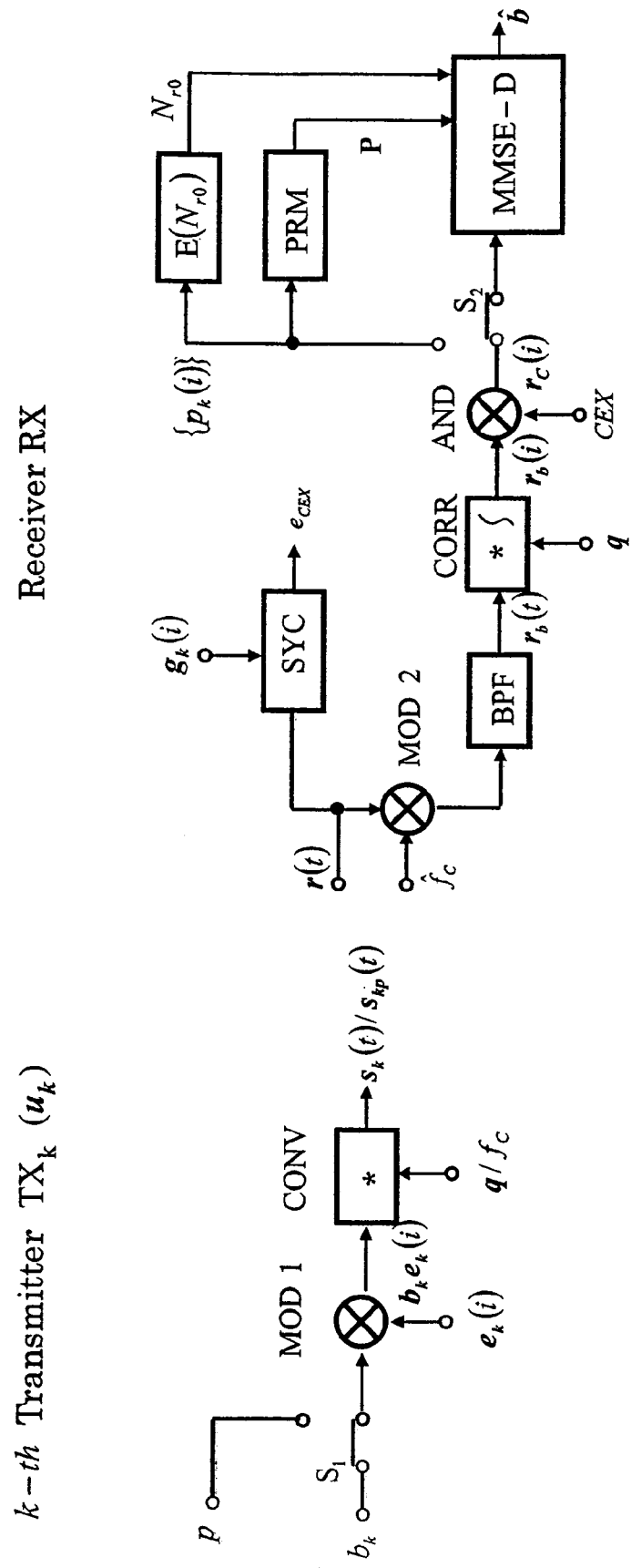
FIG. 1 is a block diagram of a transceiver.

FIG. 1 is an auxiliary explanatory diagram of the first embodiment of the present invention, and is a block diagram showing a configuration of a transceiver of a code division multiple access (CDMA) communications system. In FIG. 1, the k-th (k=0,1,2, . . . K) transmitter $TX_k$ used by the k-th user $u_k$ is shown on the left, and a receiver RX used in a base-station is shown on the right. A binary data $b_k(\in \pm 1)$ with symbol-period $T_E$ is applied as an input to transmitter $TX_k$. A symbol p denotes a pilot input which is set by p=1. Pilot input p is transmitted in a time-division-manner at a timing so as not to temporally overlap both transmit-data of all users and pilots transmitted by the other users with a switch $S_1$ shown in FIG.(a). Input $b_k$ modulates an enveloped sequence $e_k(i)$ with guard (to be described later) at a modulator MOD to generate an impulse-sequence $b_k e_k(i)$ with $L_E$ chips. A convolutional multiplier CONV, convolutionaly modulates a chip-waveform q generated on a carrier-wave having a frequency $f_c$ with respective impulses of the impulse-sequence described above. (In order to transmit each chip impulse on a bandwidth which is approximately equal to a chip rate $f_{ch}$ without inter-chip interference, a spreading range $T_q$ of chip-waveform q is set to $T_q \gg T_c$ with respect to a chip spacing $T_c$.) Convolutional multiplier CONV outputs a transmit-symbol $s_k(t)$ of the k-th user represented as (hereafter a time limited signal conveying data is expressed as a symbol):

$$s_k(t) = b_k \left\{ \sum_{i=0}^{L-1} e_k(i) q(t - iT_C) \right\} \sqrt{2} \cos 2\pi f_C t \qquad (1)$$

where $e_k(i)$ is an enveloped sequence with chip variable i, and q(t) is a chip-waveform.

The above equation expresses one symbol. (When an adjacent symbol is present, it is modified to a linear sum of equation obtained by shifting the above equation by integer times a symbol period $T_E$.)

In another time region different from the data transmission time, a symbol $s_{kP}(t)$ generated by setting $b_k = p = 1$ in Eq.(1) is transmitted as a pilot(symbol). All the users transmit transmit-data-symbols at such timings that corresponding user specific receive-symbols almost simultaneously arrive at the receiver. This is a quasi-synchronous condition. An inter-user deviation among receive-timings is controlled by a base-station so as to be less than a guard period.

Let us explain a receiver composition. A received symbol on a data transmission period at the receiver is given by the following equation as a sum of transmit-signals of all the users:

$$r(t) = \sum_{k=1}^{k=K} s_k(t) * h_k(t) + x_c(t) \qquad (2)$$

where $h_k(t)$ is a channel (gain) vector between the k-th user and a base-station, $x_c(t)$ is an AWGN, and * is convolutional multiplication. Received symbol r(t) is converted into a base-band symbol $r_b(t)$ by both a modulator MOD2 with a local carrier-wave $\hat{f}_c$ and a band-pass-filter BPF. (In MOD2, complex components are actually demodulated by using orthogonal carrier-waves.) The continuous time waveform of base-band symbol $r_b(t)$ is applied to a correlator which matches to the same waveform q(t) as the chip-waveform used in the transmitter, to produce chip impulse (discrete) received symbol $r_b(i)$ with period $T_E$. Received symbol $r_b(i)$ is applied to a gate AND which extracts a central portion (with period T) of the received symbol with period $T_E$ by the designation of a core-symbol extracting signal CEX, to generate a core receive-symbol $r_c(i)$ with period T.

During a pilot transmission period, a switch $S_2$ is turned upward, so that core received-symbol $r_c(i)$ is resultantly applied to a pilot-response memory PRM and stored therein. In general, the whole pilot transmission period is divided by K, so that each of the divided period is used for pilot transmission of the individual user. Thus, the k-th core received symbol is given by the following equation:

$$r_c(i) = p_k(i) = (p_{k1}, p_{k2}, \ldots, p_{kL})^T \qquad (3)$$

and serves as a pilot-response-vector $p_k$ of the k-th user consisting of L chips. (For convenience, a vector, and a matrix consisting of vectors may be expressed by bold-italic and bold notations, respectively.) An uppercase T is a transposing operator, and chip component $p_{ki}$ takes a complex amplitude. Although vector $p_k$ includes white noise, by receiving pilot-responses a plurality of times and calculating an average vector with them, the noise component can be neglected. A pilot-response-matrix with a size (L×K) for K users is given by the following equation:

$$P = [p_1 \, p_2 \ldots p_K] \qquad (4)$$

On the other hand, respective pilot-responses $p_k(i)$ are applied to a noise power estimating circuit $E(N_{r0})$. Circuit $E(N_{r0})$ produces a sum of a large number of pairs of vectors $p_k(i)$ while inverting the polarity of $p_k(i)$ alternately, to obtain a mean squared value as noise power. On the basis of an average value, the same mean values for all the pilot-responses as done for the k-th pilot responses, an estimated value of noise power $N_{r0}$ included in core-receive-symbol $r_c(i)$ is obtained.

During a data transmission period, switch $S_2$ is connected downward, core-receive-symbol $r_c(i)$ including white nose with power $N_{R0}$ is resultantly applied to a detector MMSE-D to which a pilot-response-matrix P is supplied from pilot-response-memory PRM. Detector MMSE-D outputs a decision vector $\hat{b} = (\hat{b}_1, \hat{b}_2, \ldots, \hat{b}_k, \ldots, \hat{b}_K)^T$ corresponding to a transmit-data-vector $b = (b_1, b_2, \ldots, b_k, \ldots, b_k)^T$.

Figure 2:
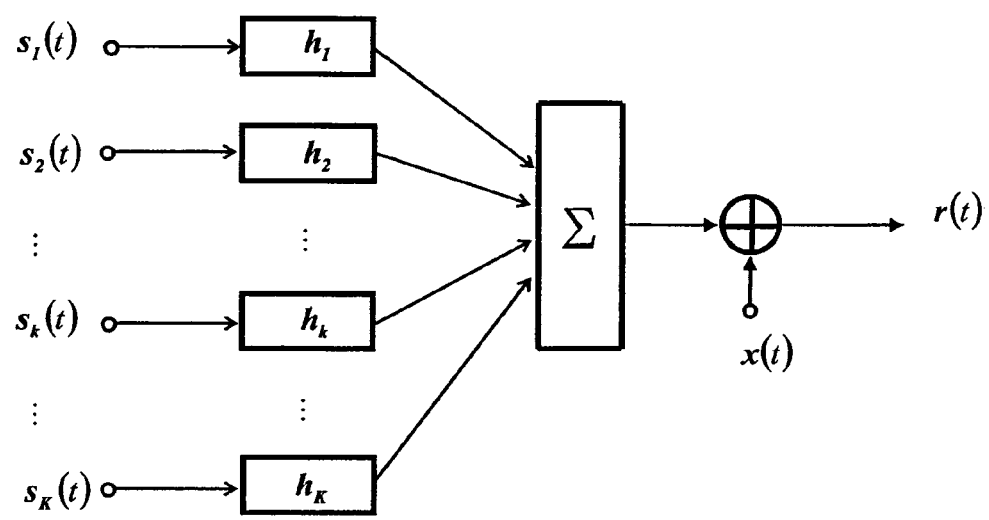
FIG. 2 is a diagram showing a transmission-paths model.

FIG. 2 is an auxiliary explanatory diagram of the present invention, showing a model diagram of multiple access transmission channels. Outputs of the K users are multiplexed in the transmission process and arrive at a receiver. The k-th transmit-data-symbol $s_k(t)$ and the k-th pilot-symbol $s_{kP}(t)$ the k-th user $u_k$ has sent out are subjected to a conversion by a channel vector $h_k$ from the transmitter to the base-station receiver. These symbols generate a base-band receive-data-symbol $r_k(i)$ and a pilot-symbol $r_{kP}(i)$ as given by the following equations:

$$\left. \begin{array}{l} r_k(i) = s_k(i) * h_k(i) = \displaystyle\sum_{j=0}^{J-1} s_k(i-j) h_{kj} \\[6pt] r_{kP}(i) = s_{kP}(i) * h_k(i) = \displaystyle\sum_{j=0}^{J-1} s_{kp}(i-j) h_{kj} \end{array} \right\} \qquad (5)$$

where $h_k=(h_{k0}, h_{k1}, \ldots, h_{kj}, \ldots, h_{kJ-1})^T$ is a complex channel vector consisting of J chips with chip-period $T_C$ which is equivalent to a channel resolution. Note that J is the number of multi-path waves including a direct wave and delayed waves.

Figure 3:
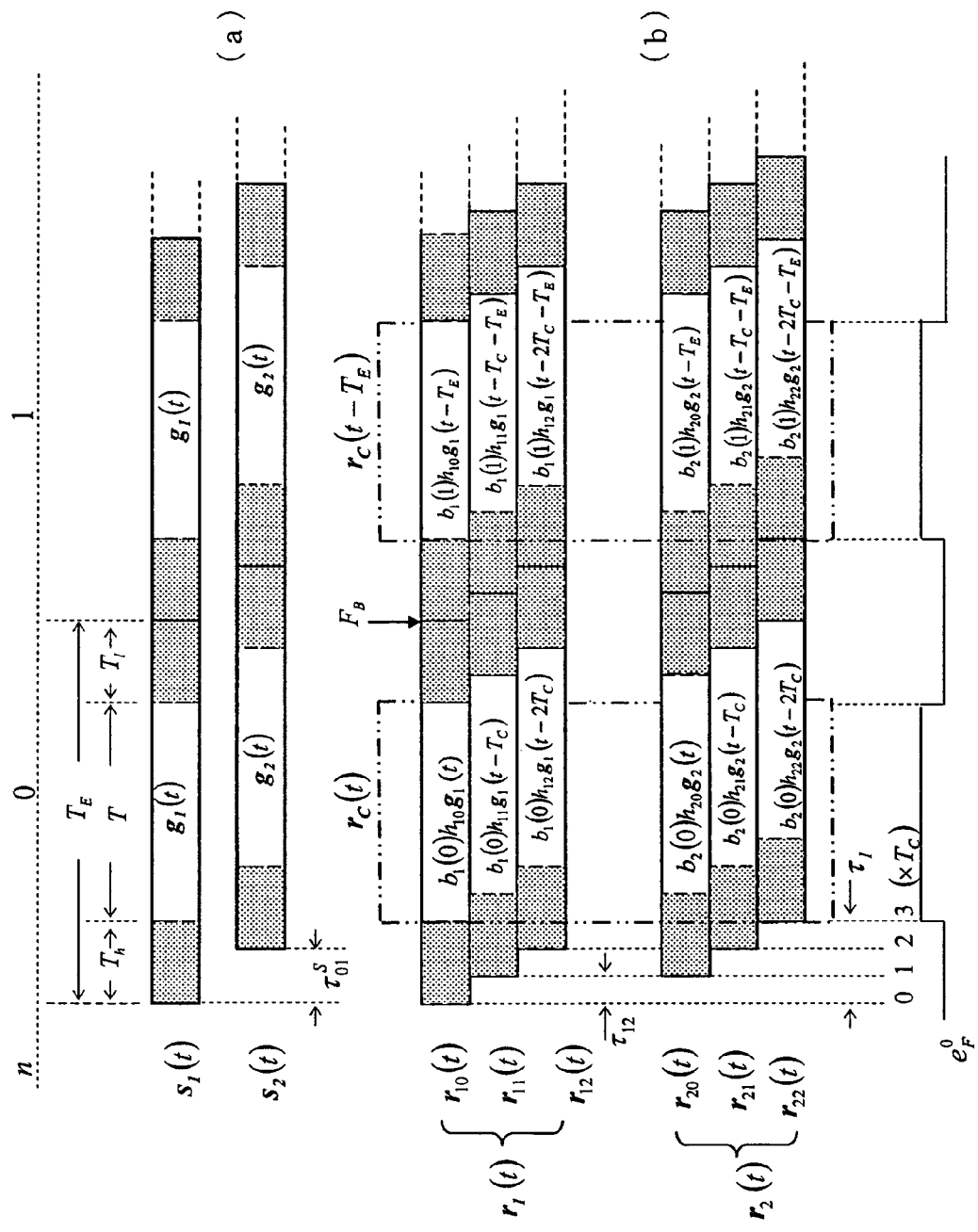
FIGS. 3(*a*) and 3(*b*) are time charts of symbol-sequences composed of base-band transmit-/receive guard added symbols.

FIG. 3 is an auxiliary explanatory diagram of the first embodiment of the present invention, showing a timing relationship between transmit-/receive-symbol sequences. When the k-th user $u_k$ (k=1,2) transmits a transmit-symbol sequence as shown in FIG. 3(a), receive-symbol sequences received from the respective users are shown in user multi-path component wise in FIG. 3(b), where a user specific receive-symbol corresponding to individual transmit-symbol is composed of three multi-path components associated with a case of J=3. Consider a sum of the maximum value $\tau_m$ of a deviation between direct waves of a pair of user specific receive-symbols ($\tau_m=\tau_{12}$ for the case shown in FIG. 3) and a delayed wave spread $(J-1)T_c$. According to the following expression:

$$T_h, T_I > |\tau_m| + (J-1)T_C \quad (6)$$

A guard sequence period (guard time) $T_h(=L_h T_C)$ and $T_I(=L_I T_C)$ should be designed so as to be longer than the sum. This condition is satisfied by controlling transmit-timing of all the users. This control provides a condition such that respective symbol boundaries $F_B$ shown in FIG. 3 are not included in the core period T, that is a central portion of enveloped symbol-period $T_E$, as shown by a time duration enclosed by double dotted lines. Thus let us extract a core-receive-symbol $r_c(t)$ over core-period as an object to be analyzed, because due to the protecting function of the guard sequence (that is to avoid ISI), a simple analysis can be performed.

Here, a base-band received discrete symbol (over period $T_E$) associated with Eq.(2) is represented by the following equation:

$$r_b(i) = \sum_{k=1}^{K} \{s_k(i) * h_k(i)\} + x(i) \quad (7)$$
$$\{-L_h \leq i \leq (L+L_i-1)\}$$

where $L_h$ and $L_I$ are a header length and a tail length of the guard sequences, respectively. A core-symbol is given by limiting the chip-sequence-range of a symbol:

$$r_C(i) = r_b(i) \quad \{0 \leq i \leq (L-1)\} \quad (8)$$

When the enveloped spreading-sequence $e_k(i)$ is defined as a periodic sequence of core-sequence $g_k(i)$, the j-th delayed wave component of the core-sequence included in the core receive-symbol can be expressed as $h_{kj}g^*_k(i-j)$, where $g^*_k(i-j)$, is the j-shift sequence of $g_k(i)$ and upper script * means a sequence with L chips. For this reason, $r_c(i)$ is given by the following equation:

$$r_C(i) = \sum_{k=1}^{K} \sum_{j=0}^{J-1} b_k h_{kj} g^*_k(i-j) + x(i) \quad (9)$$

Symbol $r_{kp}(i)$ in Eq.(5) is equivalent to data-symbol $r_C(i)$ obtained by setting $b_k=1$ in Eq.(9). According to Eq.(3), the following equation holds good:

$$r_C(i) = r_S(i) + x(i) = \sum_{k=1}^{K} b_k p_k(i) + x(i) \quad (10)$$

Therefore, the core receive-symbol is composed of a sum of binary value modulated user specific pilot-responses, and is given by any one of the following vector representations:

$$r_c = Pb + x \quad (11\text{-A})$$

$$P\tilde{b} = r_c = r_s + x \quad (11\text{-B})$$

where $r_c$ is a core receive-(data)vector which includes a receive-signal vector $r_s$ [first term of a right-hand side in Eq.(10)] and a white noise vector $x=(x_1, x_2, \ldots, X_L)$ as the components, b denotes a transmit-data-vector, $\tilde{b}$ is a soft-output vector obtained by adding an error vector $\Delta b$ to b, and P denotes a matrix in Eq.(4). When the both the side terms of Eq.(11-B) are multiplied by a Hermitian (transposed conjugate) matrix $p^H$ of a pilot-response-matrix P, $$P^H p\tilde{b} = P^H r_C \quad (12)$$

is obtained. This is a system of linear equations with multiple unknowns obtained when a decorrelating detector (DD) is used. In order to increase the regularity of $P^H P$ of the above equation, a system of linear equations of the minimum mean square error (MMSE) criterion is used. The system is represented by replacing matrix $P^H P$ in Eq.(12) with the following matrix U, according to a known theory. (Since this system is later used for a decision of the best user at the first stage, the system is called the first system of decorrelating equations.)

$$\left.\begin{array}{c} Ub = P^H r_C (=y) \\ (K \times K)(K \times 1) \ (K \times L)(L \times 1) \\ (K \times K)(K \times 1) \ (K \times L)(L \times 1) \end{array}\right\} \quad (13)$$

$$\begin{aligned} U &= P^H P + N_{r0} I \\ &(K \times K) \ (K \times L)(L \times K) \ (K \times K) \\ &= \begin{pmatrix} \rho_{11} + N_{r0} & \rho_{12} & \cdots & \rho_{1K} \\ \rho_{21} & \rho_{22} + N_{r0} & \cdots & \rho_{2K} \\ \vdots & \vdots & \ddots & \vdots \\ \rho_{K1} & \rho_{K2} & \cdots & \rho_{KK} + N_{r0} \end{pmatrix} \end{aligned} \quad (14)$$

$$\rho_{lk} = p_l p_k$$

where U is a user-separating matrix having row-number $l(=1,2,\ldots,L)$ and column-number $k(=1,2,\ldots,K)$, I is an identity matrix, $N_{r0}$ is power of white noise vector x, and y is a matched filter output vector (will be described later). The sizes (the number of rows×the number of columns) of a matrix and a vector are described in parentheses. Therefore, the system of equations are solved to produce a soft-output-vector $\tilde{b}$ that is given by the following equations:

$$\tilde{b} = b + \Delta b = U^{-1} P^H r_C \quad (15)$$

$$\Delta b = \Delta b_x + \Delta b_1 \quad (16\text{-A})$$

$$\Delta b_x \cong U^{-1} P^H x = Cx \quad (16\text{-B})$$

$$\Delta b_I = -U^{-1} b \quad (16\text{-C})$$

where $\Delta b$ is an error vector consisting of a component $\Delta b_x = [\Delta b_{x1}, \Delta b_{x2}, \ldots, \Delta b_{xk}, \ldots \Delta b_{xK}]^T$ depending on white noise x included in a received symbol, and an interfering noise component $\Delta b_I=[\Delta b_{I1}, \Delta b_{I2}, \ldots, \Delta b_{Ik}, \ldots, \Delta b_{IK}]^T$ generated due to the additive term $N_{r0}I$, and C denotes a noise evaluation matrix (will be described later). Note that Eq.(16-B) includes a certain interfering noise component.

The k-th component $\tilde{b}_k$ of the soft-output-vector obtained in Eq.(15) is made by a hard decision to obtain the k-th detected value $\hat{b}_k$. Setting $N_{r0}=0$ in Eqs.(13) to (16) makes a relation $U=P^H P$, resulting in a system of equations for a system DD. In this case, interfering noise of Eq.(16-B) is eliminated, leading to $\Delta b_I=0$. However, $\Delta b_x$ increases in comparison with a system MMSE. The above function is almost achieved by a conventional technology. However, since the conventional technology does not use guard sequences, it degrades the performance due to inter-symbol interference caused by delayed waves. Therefore, it is difficult to sufficiently decrease a bit error rate (BER) with the conventional methods. As the number of users K increases, the regularities of the matrices $P^H P$ and U are deteriorated, and rate BER increases. As a consequence, the above described conventional systems are forced to have disadvantages such as an increase in transmit-power and reduction of frequency-utilization-efficiency. In order to solve the problem, the present invention uses the following method.

A sequential detection type CDMA multi-user reception system according to the first embodiment of the present invention is described below.

A right-hand-side matrix C in Eq.(16-B) is expressed by the following equation:

$$C = U^{-1}P^H = [C_1, C_2, \ldots, C_k, \ldots, C_K] \quad (17)$$
$$C_k = (c_{k1}, c_{k2}, \ldots, c_{kL})^T$$
$$c_{kl} = \frac{(k+l)^{-1} p_{kl}^* [\tilde{U}_{kl}]}{\det[U]} (l=1, 2, \ldots, L)$$

where $C_k$ is called a noise evaluation vector corresponding to the k-th user, det [U] denotes the determinant of matrix U, and $[\tilde{U}_{kl}]$ denotes a cofactor obtained by removing the k-th row and the l-th column from matrix U. Here, using Eq.(16-B), let us obtain an evaluated average power $P_{xk}$ of the k-th component $\Delta b_{xk}$ of an error vector $\Delta b_x$ included in the soft-output of the k-th user, by the following equations:

$$P_{xk} = E|\Delta b_{xk}|^2 = E\left\{\sum_{l=1}^{L}|c_{kl}\bar{x}_l|^2\right\} = P_{Ck}N_{r0}/L \quad (18)$$

$$P_{Ck} = \sum_{l=1}^{L}|c_{kl}|^2 \quad (19)$$

Therefore, an expectation of evaluated average power $P_{xk}$ is in proportion to a Power $P_{Ck}$ of vector $C_k$ that is the k-th component of matrix C. Thus, a power vector $P_C=(P_{C1}, P_{C2}, \ldots P_{CK})$ is obtained. For this reason, as power $P_{Ck}$ decreases, a correct solution probability of a hard decision value on the k-th soft-output $\tilde{b}_k$ calculated for user $u_k$ increases. [Since $P^H x$ in Eq.(16-B) is considered as a noise input, even though $P_{xk}$ is calculated by setting $C=U^{-1}$, almost the same evaluation can be obtained.]

Figure 4:
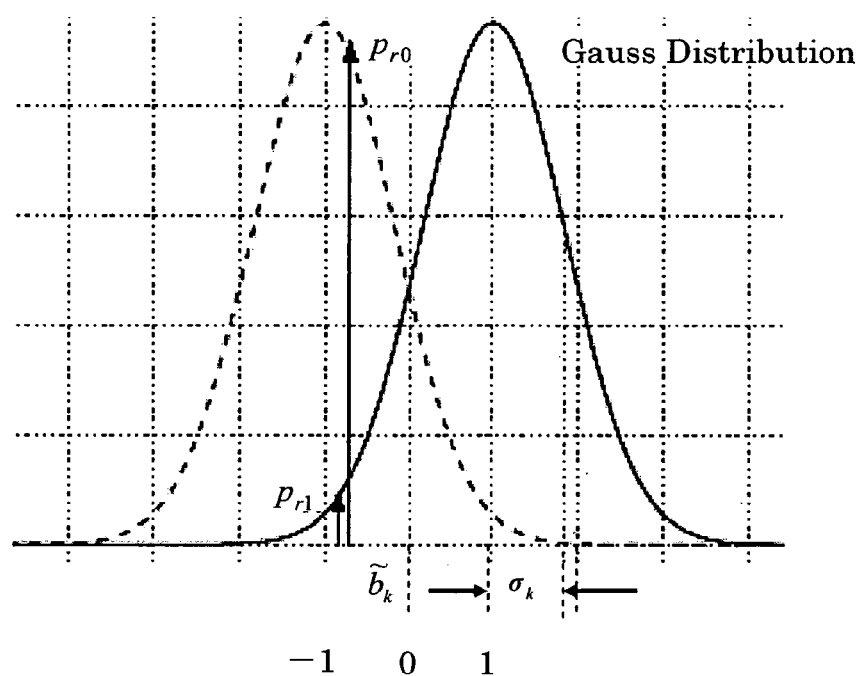
FIG. 4 is an illustration showing frequency distribution characteristics to calculate a correct solution occurrence probability based on a soft-output.

FIG. 4 is an auxiliary explanatory illustration of the present invention, showing model characteristics of a soft-output distribution.

These characteristics are obtained by considering that the correct solutions are given as $b_k \in \pm 1$ in Eq.(11) and an error voltage $\Delta b_{xk}$ can be assumed to have a Gaussian distribution with the following standard deviation $\sigma_k$:

$$\sigma_k = \sqrt{\alpha_k N_0} = \sqrt{\alpha_k N_{r0}/L} = \sqrt{P_{xk}} \quad (20)$$

$$\alpha_k = L\frac{P_{xk}}{N_{r0}}. \quad (21)$$

where $\alpha_k$ is called a noise amplification factor, and $N_0$ is power of a data-symbol (not spread yet). From the actually obtained value of soft-output vector $\tilde{b}$, Log Likelihood Ratio LLR is obtained by the following equation with $\tau_k$ in Eq.(20). The correct solution probability is given by normalizing LLR as a normalized probability ratio $\lambda_k$.

$$LLR(b_k) = \log_e \frac{p_{r1}(b_k=1|\tilde{b}_k)}{p_{r0}(b_k=-1|\tilde{b}_k)} = \frac{p_{r1}(\sigma_k)}{p_{r0}(\sigma_k)} \quad (22)$$
$$\lambda_k = \tan^h LLR(b_k)$$

where $p_{r1}(\sigma_k)$ and $p_{r0}(\sigma_k)$ are probability values obtained by assuming a Gaussian distribution with standard deviation assumes $\sigma_k$ as shown in FIG. 4.

Normalized probability ratio $\lambda_k$ has a value ranging from 1 to −1 and the polarity which is equal to that of the corresponding soft-output. As $|\lambda_k|$ is close to 1, the correct solution probability of a hard decision value on the k-th soft-output $\tilde{b}_k$ increases.

An arbitrary function $\gamma_k$ including $P_{Ck}$ in Eq.(19) and $\gamma_k$ in Eq.(22) as the elements can be used as a correct solution measure.

$$\gamma_k = F(P_{Ck}, \gamma_k) \quad (23)$$

When $P_{Ck}$ or $\lambda_k$ is directly used as a correct solution measure, the best user $u_{k'}$ ($k' \in 1, 2, \ldots K$) satisfies the following equation.

$$k' = \arg\min [P_{Ck}](k \in 1,2,\ldots, K) \quad (24\text{-A})$$

$$k' = \arg\max [\lambda_k](k \in 1,2,\ldots, K) \quad (24\text{-B})$$

As power $P_{Ck'}$ decreases (as $\lambda_{k'}$ increases), the error power of a soft-output $\tilde{b}_{k'}$ of a user $u_{k'}$ decreases and a correct solution probability of a detected value $\hat{b}_{k'}$ of user $u_{k'}$ increases.

In the above description, the k'-th user having the highest correct solution measure can be determined as the first best user k'. A method of determining the second best user will be described below. First, by removing the first best user component from both core-receive-symbol r, and pilot-response-matrix P, the following equation is obtained:

$$r_C^1 = r_C - \hat{b}_{k'} p_{k'} \quad (25)$$
$$P^1 = (p_1^1, p_2^1, \ldots, p_{k'-1}^1, p_{k'+1}^1, \ldots p_K^1)$$

When the above-equation is substituted into $r_c$ and P in Eqs.(13) and (14), the following second system of decorrelating equations is obtained:

$$U^1 b^1 = P^{1H} r_C^1 \\ [(K-1) \times (K-1)][(K-1) \times 1][(K-1) \times L](L \times 1)$$ (26)

$$U^1 = P^{1H} P^1 \\ \begin{bmatrix} (K-1) \times \\ (K-1) \end{bmatrix} [(K-1) \times L][L \times (K-1)] \begin{bmatrix} (K-1) \times \\ (K-1) \end{bmatrix}$$ (27)

Where $b^1$ is a transmitted data vector with all the user's components except one that is $b_k^1$.

According to these equations, although the length of core-receive-symbol $r_c^1$ is invariant (length L), the size of matrix decreases from $U^0(K \times K)$ to $U^1\{(K-1) \times (K-1)\}$ [$U^0$ is of use for the first system in Eq.(14)]. In general, the decrease in size advantageously makes the regularity of matrix $U^1$ higher than that of U. Furthermore, since $P^1$ does not include $p_{k'}$, a component $\rho_{k'k'}+N_{r0}$ included in U in Eq.(14) is eliminated, and a part of an interference vector $\Delta b^1$ generated by additive term $N_{r0}I$ is eliminated. The improvement in regularity of matrix U decreases the absolute amplitude of error vector $|\Delta b_x|$ in Eq.(16-B), and the removal of $\tau_{k'k'}+N_{r0}$ included in matrix U decreases the absolute amplitude of error vector $|\Delta b_I|$ in Eq.(16-C). For this reason, absolute error amplitude of error vector $|\Delta b|$ generally decreases. When Eq.(26) is solved, the following equation is obtained:

$$\tilde{b}^1 = b^1 + \Delta b^1 = [U^1]^{-1} P^{1H} r_C^1$$ (28)

Let a soft-output error vector in Eq.(16-A) be $\Delta b^0$. Consider a comparison between soft-output error vectors $\Delta b^0$ and $\Delta b^1$ in Eq.(28) with respect to power. For the above reason, the following equation is established:

$$|\Delta b^1|^2 < |\Delta b^0|^2$$ (29)

Therefore, when detected value $\tilde{b}_{k'}$ of the first best user is correct, an average error-rate of (the detected data of) the users except for the first best user is lower than that of (that of) all the users calculated from Eq.(15). Equation (28) with which an improved error characteristic can be expected is solved, to determine the second best user k" among the remaining users by the same method as that performed with Eq.(23) or (24). In this case, $P_{Ck}$ in Eq.(19) must be again calculated by putting $C^1 = [U^1]^{-1} P^{1H}$ in place of C in Eq.(17). In this manner; respective errors included in both soft-outputs $\tilde{b}_{k'}$ and $\tilde{b}_{k'}$ obtained at the 0-th stage soft-output and the first stage are considerably smaller than an average value of errors of soft-outputs obtained from Eq.(15) in a conventional system. These processes are repeated, transmit-data of all the users are thus sequentially detected.

Figure 5:
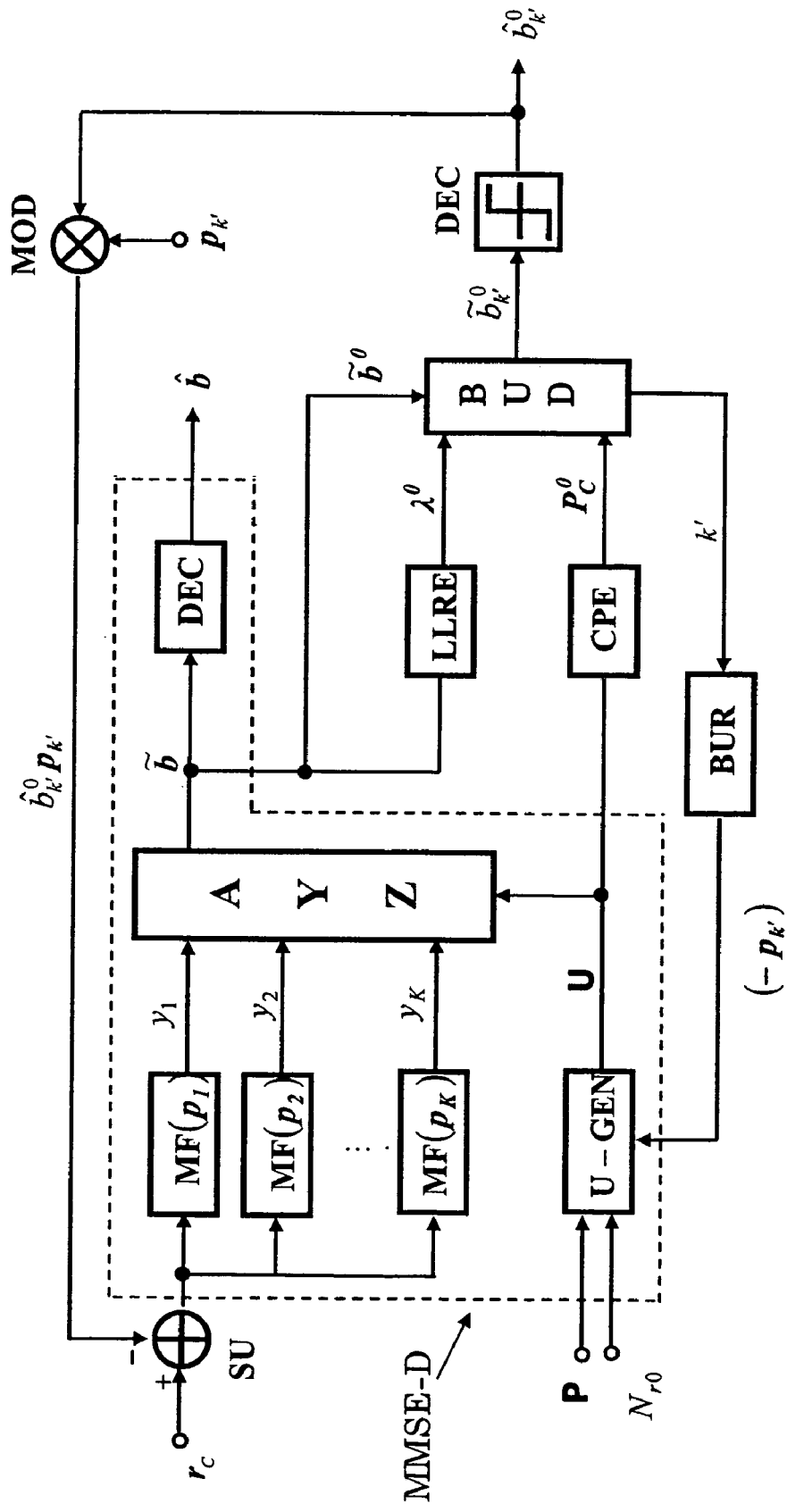
FIG. 5 is a block diagram of a sequential detection type MMSE receiver.

FIG. 5 is a block diagram of a sequential-detection-type minimum-mean-square-error detection system (SD-MMSE) showing the first embodiment of the present invention. In FIG. 5, a function of sequentially determining of the best users as described above is added to a conventional minimum mean square error detector MMSE-D indicated by a frame with dotted-line. An operation of detector MMSE-D will be described below. A core-receive-input $r_c$ is applied to K matched filters $MF(p_k)$ matched to pilot-responses $p_k$ to generate correlation outputs $\gamma_k$ (k=1,2, ... K), respectively.

A correlation vector y consisting of K pieces of the components $\gamma_k$ is equivalent to the right-hand-side term of Eq.(13) and is given by:

$$y = (y_1, y_2, \ldots, y_k, \ldots, y_K)^T = P^H r_C + x$$ (30)

U-GEN in FIG. 5 denotes a generating circuit to generate matrix U expressed in Eq.(14), using both pilot-response-matrix P which is made with all the pilot-responses $p_k(i)$ stored in pilot-response-memory PRM, and noise power $N_{r0}$ stored in noise power estimator $E(N_{r0})$. [PRM and $E(N_{r0})$ are shown in FIG. 1.]. Matrix U is applied to an analyzer AYZ together with correlation vector y. Analyzer AYZ performs the function in Eq.(15) to obtain soft-output vector $\tilde{b}$.

Soft-output-vector $\tilde{b}$ is applied to a hard decision circuit DEC to obtain a decision vector $\hat{b} = [\hat{b}_1, \hat{b}_2, \ldots \hat{b}_k, \ldots \hat{b}_K]^T$ consisting of detected values for K users. Above described function is performed by a basic circuit of a conventional detector, called MMSE-D, which is a partial circuit shown inside a dotted-line frame in FIG. 5.

Let us call the circuit above described the 0-th stage, MMSE-D by renaming the user-separating matrix as $U^0$ and the soft-output vector as $\tilde{b}^0$, and explain a function of a circuit shown outside the dotted-line frame.

CPE shown in FIG. 5 denotes a power estimator for matrix C defined by Eq.(17). Power estimator CPE calculates an evaluated power vector $P_C^0 = (P_{C1}^0, P_{C2}^0, \ldots, P_{CK}^0)^T$ as the 0-th power for respective users, based on matrix $U^0$. On the other hand, soft-output $\tilde{b}^0$ is applied to a logarithmic likelihood ratio estimator LLRE to generate a normalized probability ratio $\lambda^0 (=\lambda_1^0, \lambda_2^0, \ldots \lambda_K^0)$ for the K users in Eq.(22). These output vectors $P_C^0$ and $\lambda^0$ are applied to a best user decision circuit BUD. For example, a process expressed by Eq.(24-A) or (24-B) is performed to select one $\tilde{b}_{k'}^0 (k' \in 1, 2, \ldots K)$ as the (first) best user soft-output among all the elements of soft-output vector $\tilde{b}^0$. Selected soft-output $\tilde{b}_{k'}^0$ is applied to a hard decision device DEC to make a hard-decision output (detected value) $\hat{b}_{k'}^0 (\in \pm 1)$.

Detected value $\hat{b}_{k'}^0$ is applied to a modulator MOD so as to generate $\hat{b}_{k'}^0 p_{k'}$. On the other hand, the best user k' determined by best user decision circuit BUD is applied to a best user remover BUR to generate a removing vector $-p_{k'}$. These outputs are applied to a summing circuit SU and user-separating matrix generator U-GEN to make a receive-vector $r_c^1$ as the first receive-vector and a pilot-response-matrix $P^1$ as the first pilot-response-matrix according to Eq.(25). These outputs $r_c^1$ and $P^1$, in addition to noise power $N_{r0}$ are applied to the first stage MMSE-D to calculate a soft-output-vector $\tilde{b}^1$, and a user-separation-matrix $U^1$. Estimator LLRE produces a normalized probability ratio a normalized probability ratio $\lambda^1$ with $\tilde{b}^1$, and estimator CPE produces an evaluated power vector $P^1_C$. By using these results the best user decision circuit BUD determines $\tilde{b}_{k''}^1$ (k''∈1,2, ... K, k''≠k') as the second best user soft-output, by performing the same operation as that done by the first stage MMSE-D. Then, decision circuit DEC obtains a decision value $\hat{b}_{k''}^1$ for the k''-th user with soft-output $\tilde{b}_{k''}^1$. Note that the number of candidate users for k'' is K−1, because the first receive vector $r_c^1$ dose not include the components of the first best user. These operations are repeated K times while using the k-th (k=0,1,2, ... K−1) stage MMSE-D sequentially to generate decision outputs of all the users.

In this case, in place of a constant (noise power) $N_{r0}$ of the additive vector $N_{r0}I$ included in matrix U in Eq.(14), a generalized additive vector $N_{r0}a$ given by the following equation can be used:

$$U = P^H P + N_{r0} a 1 \\ a = [a_1, a_2, \ldots, a_K] \\ a_k > 0$$ (31)

According to the generalized additive vector, the value of the correct solution measure can be improved. Calculate correct solution measures obtained for a plurality of generalized additive vectors, then it is possible to find a user representing the best value among the correct solution measures, as the best user.

As an evaluation measure of system performance, let us use a power-bandwidth-product. This is defined as a product of a transmit-power $P_{TX}$ and a transmission band-width B required for 1-bit transmission, as given by the following equation, $$[PB] = \frac{P_{TX}B}{K} = \frac{\xi P_{BP} L\beta}{TK} \quad (32)$$
$$\left[ P_{TX} = \xi P_{BP}, \xi = [E_b/N_0]_{SD} / [E_b/N_0]_{BP}, B = \frac{L\beta}{T} \right]$$

where $[E_b/N_0]_{BP}$ is a received SN ratio required to obtain error rate (for example, $BER_0=10^{-3}$) when one user performs BPSK (Binary Phase Shift Keying) transmission under an AWGN (white noise) environment, $P_{BP}$ is a transmit-power corresponding to $[E_b/N_0]_{BP}$ ($E_b/N_0$ denotes a ratio of received energy $E_b$ per bit and a received white noise power $N_0$ after despreading, and used as a theoretical reference value of the transmit-power), $[E_b/N_0]_{SD}$ is a received SN ratio required to obtain the same value as $BER_0$ for the SD-MMSE system, $\beta$ is a band-amplification-coefficient due to the guard sequences used in FIG. 3, and T is a core-symbol-period. Since the common terms can be set as $P_{BP}=1$ and $T=1$, Eq. (32) is simplified into the following equation:

$$[PB] = \frac{\xi L \beta}{K} \quad (33)$$

Above-described sequential detection type MMSE (including DD) system, in comparison with the conventional system, can reduce considerably $\xi$, and K can be made equal to core-sequence-length L that is the maximum theoretically achievable value. For this reason, the value of [PB] can be considerably reduced, resulting in performance improvement.

An interference-control type MMSE detection system according to the second embodiment of the present invention will be described below.

In a minimum-mean-square-error detector MMSE-D, as expressed in Eq.(15), the soft-output includes interfering noise $\Delta b_I$. In order to keep the performance from this interfering noise, the interference-control type MMSE system is introduced.

An additive vector $N_{r0}I$ in Eq.(14) can increase the regularity of matrix U and reduces the amplitude of white noise related error $\Delta b_x$ depending on AWGN in Eq.(16-B). However, in compensation for the advantages, the interfering noise $\Delta b_I$ in Eq.(16-C) generates. This is because components other than pilot-responses P constituting a receive-symbol is added to user separating matrix U due to the additive vector. In order to remove the interference generating function caused by the additive vector, it is effective to use Eq.(34-A) that is made by adding a term $-N_{r0}b$ to the left-hand side of Eq.(13). Thus the interference removal can be achieved on the equation.

$$Ub - N_{r0}b = P^H r_C \quad (34\text{-A})$$

$$Ub = P^H r_C + N_{r0}b \quad (34\text{-B})$$

Making Eq.(34-B) by transposing term $N_{r0}b$ to the right-hand side, and solving it with respect to b, then the following equation is obtained:

$$\tilde{b} = U^{-1}P^H r_C + N_{r0} U^{-1} b \quad (35)$$

In the above equation, b in the right-hand side is an unknown, b cannot be used in the receiver. Therefore, let us consider a soft-output-vector of a detector MMSE-D as a soft-output of the 0th stage MMSE-D, denoted by $\tilde{b}^0$. Using $\tilde{b}^0$ as an approximate vector for b shown in the right-hand side of Eq.(35), a soft-output $\tilde{b}^1$ of the first stage MMSE-D can be generated as represented in the following equations, $$\tilde{b}^1 = \tilde{b}^0 + c^0 \quad (36)$$

$$c^0 = U^{-1} N_{r0} \tilde{b}^0 \quad (37)$$

Where $c^0$ is a vector named as the 0-th interference-correcting vector.

Here, when it is assumed that core-receive-vector $r_c$ does not include AWGN, a perfect correcting-vector is obtained when $\tilde{b}^0 = b$ is satisfied in Eq.(37). For this reason, if the relation $\tilde{b}^1 = b$ is satisfied in Eq.(35), interfering noise can be completely removed. Considering a relation $\Delta b \neq 0$ indicated by Eq.(16), interfering noise cannot be completely removed. However, as long as $\tilde{b}_k^0 b_k > 0$ is satisfied for the most of K components composing of vectors $\tilde{b}^0$ and b, correcting vector $c^0$ can display an effective correcting role. With this correction method, vector $\tilde{b}^1$ tends to be closer to transmit-vector b than $\tilde{b}^0$.

When the first-stage correcting vector $c^1$ is calculated by using soft-output-vector $\tilde{b}^1$ of the first stage MMSE-D having a noise component less than that of the 0-th soft-output $\tilde{b}^0$, a soft-output $\tilde{b}^2$ of the second stage MMSE-D using $c^1$ can be calculated from the following equations:

$$\tilde{b}^2 = \tilde{b}^0 + c^1 \quad (38)$$
$$c^1 = U^{-1} N_{r0} \tilde{b}^1$$

The process is repeated n times to make a hard decision on a final soft-output $\tilde{b}^n$ thereby obtaining a detected vector $\tilde{b}^n$, Where n can be set arbitrarily.

Figure 6:
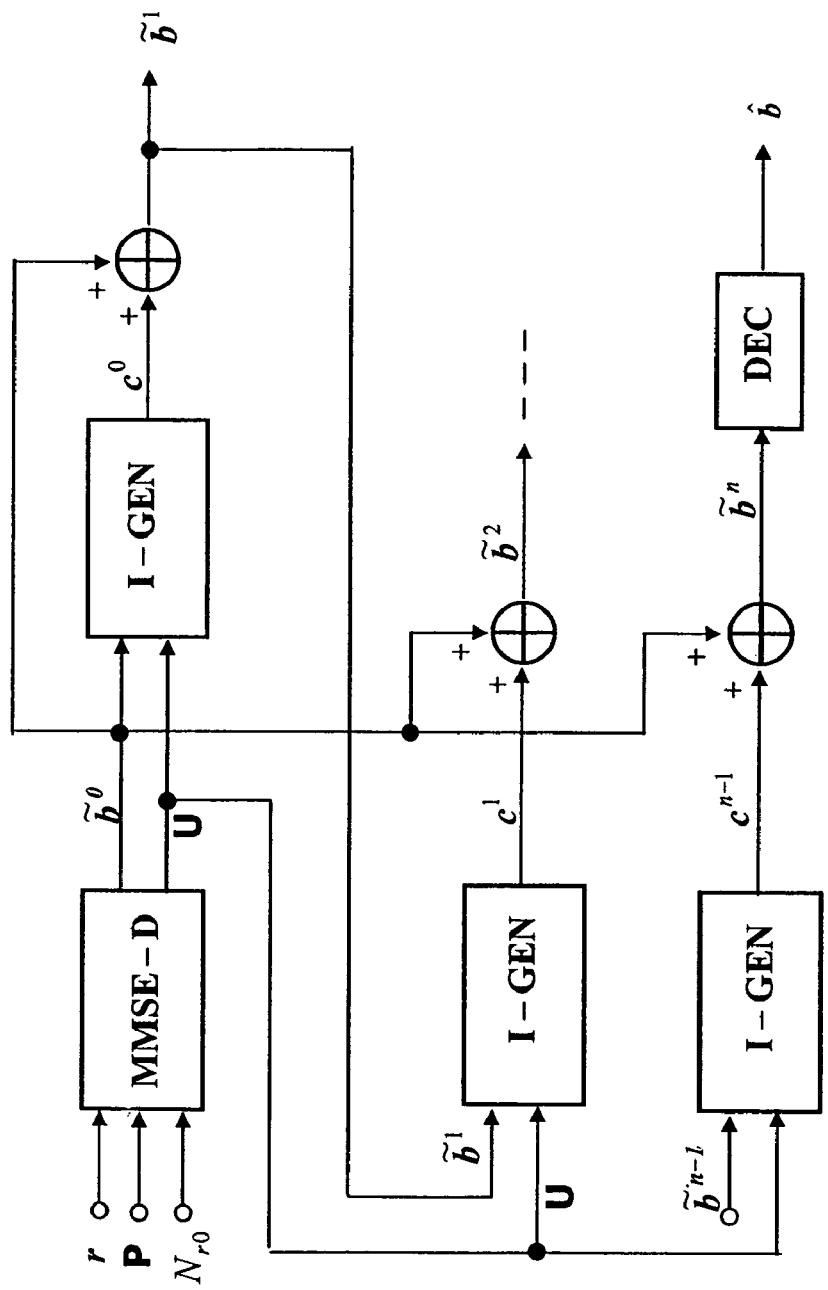
FIG. 6 is a block diagram of an interference-control MMSE detector.

FIG. 6 is a diagram of the second embodiment of the present invention, showing a block diagram of an interference-control type minimum-mean-square-error detector. A minimum mean square error circuit (MMSE) shown in FIG. 6 is constituted by a partial circuit obtained by removing a portion of decision circuit DEC from detector (MMSE-D) inside a dotted-line frame in FIG. 5. A base-band receive-symbol r [$r_c(t)$ in FIG. 3], a pilot-response-matrix P in Eq.(4), and a noise power $N_{r0}$ contained in the receive-vector [an output of $E(N_{r0})$ in FIG. 1] are applied to circuit MMSE shown. Circuit MMSE generates a user-separating matrix U using matrix P and noise power $N_{r0}$ and then produces a soft-output $\tilde{b}^0$ of the 0-th stage MMSE and a user-separating matrix U according to the process of Eq.(15). These outputs are applied to an interference generator I-GEN$_0$. Generator I-GEN$_0$ generates interference-estimating vector $c^0$ of the 0-th stage MMEE as the 0-th stage correcting term. By adding vector $c^0$ to the 0-th soft-output $\tilde{b}^0$, a soft-output $\tilde{b}^1$ of the first stage MMSE is obtained.

Soft-output-vector $\tilde{b}^1$ and matrix U which has been generated by the first stage MMSE are applied to an interference generator I-GEN$_1$ to generate an interference-correcting vector $c^1$ by the same method as that of generator IGN. The interference-correcting vector $c^1$ is added to the soft-output $\tilde{b}^0$ of the 0-th stage to generate $\tilde{b}^2$ of the second stage MMSE. By applying the n-th soft-output-vector $\tilde{b}^n$ obtained after the processes of n stages to hard decision circuit DEC to make a final decision (detected) vector $\hat{b}$. In this manner, the transmit-data of the K users are decided. In Eq.(38), soft-output vector $\tilde{b}^1$ can also be used in place of vector $\tilde{b}^0$ in the right-hand side.

The following means is used to further improve a correction-effect obtained by the correction vector.

(C-1): When the correction vector is used in an environment in which a received S/N ratio ($E_b/N_0$) is low, Eq.(14) is modified as:

$$U = P^H P + \lambda_N N_{r0} I \quad (\lambda_N > 1) \tag{39}$$

As a coefficient $\lambda_N$ is increased, $\Delta b_x$ in Eq.(16-A) is reduced, and $\Delta b_I$ is increased. The increased $\Delta b_I$ is canceled by correction vector c.

(C-2): An amplitude of correction vector c is set as a function of a frequency (measure of interference intensity, and called interference power estimate coefficient) such that respective components of vector $\tilde{b}$ take values close to zero.

(In the above description, c and $\tilde{b}$ should be candidates of the n-th vector (n=1, 2, ... n) which are calculated subseciuently according the analyzing process described in the preceding parts. For simplicity, the upper-script of n is often omitted hereafter.)

As this interference power estimate coefficient θ, for example, the following equation is used with a threshold value $\alpha_r (\in 0.5 \sim 1)$.

$$\theta(a_r) = \sqrt{\frac{P_f}{P_b}} \tag{40}$$

$$\begin{bmatrix} P_f = E\{(1 - |\tilde{b}_k|)^2\} & (|\tilde{b}_k| < a_r) \\ P_b = E(|\tilde{b}_k|^2) & \end{bmatrix}$$

where E denotes an operator taking an ensemble average. $P_f$ is an average power of components included in vector $\tilde{b}$ each of which takes a larger absolute amplitude than the threshold value $\alpha_r$, and $P_b$ is an average power of components included in vector $\tilde{b}$ each of which takes a smaller absolute amplitude than the threshold value $\alpha_r$.

(C-3): If a component $|\tilde{b}_k| \geq 1$, in soft-output vector b takes a relation $\tilde{b}_k$ when the correction vector c is used, excessive corgection should have been performed. In order to avoid this problem, this system can introduce a threshold value B(<1) to modify the values of soft-output components, thereby modifies Eq.(37) so as to make the following equation:

$$\begin{aligned} c(B) &= U^{-1} \lambda_N N_{r0} \tilde{b}^L \\ \tilde{b}_k^L &= \tilde{b}_k & |\tilde{b}_k| \leq B \\ \tilde{b}_k^L &= \text{sign}(\tilde{b}_k) B & |\tilde{b}_k| > B \end{aligned} \tag{41}$$

When both the methods (C-2) and (C-3) are cooperatively used, a correction vector called by an enhanced interference correction vector is given by the following equation:

$$c(\alpha_r, B) = \theta(\alpha_r) U^{-1} \lambda_N N_{r0} \tilde{b}^L \tag{42}$$

The values $\lambda_N$, $\alpha_r$, and B are selected so as to enhance the correction effect of interference-correcting vector c. This enhanced interference correction vector is obtained as the n-th coefficient in turn according to Eqs. (36)-(38). As a result, the n-th modified soft-output vector $\tilde{b}^n$ can be obtained for a final soft-output to be detected. This method can reduce a disturbing effect due to noise and interference which conventional MMSE method has to suffer, thereby can improve the error rate.

When the techniques of interference-correction according to the second embodiment is combined to the sequential detection type receiver of the first embodiment or third to fifth embodiments (will be described later), noise of these systems can be further reduced.

A combined pilot type decorrelating discrimination system according to the third embodiment of the present invention will be described below. In the first and second embodiments, an enveloped sequence obtained by adding a guard sequence to a core-sequence is used as the spreading-sequence. In this case, the receiver cannot use transmit-energy corresponding to the guard sequence length. As the data-rate increases, the guard sequence length to the core-sequence length ratio get too large to be neglected. In order to avoid this energy loss, the present invention, provides a system in which an user transmitter uses only a core-sequence to spread transmit-data, generating a transmit-symbol with the core-sequence, and a receiver demodulates a receive-symbol without suffering from ISI (inter-symbol interference).

Figure 7:
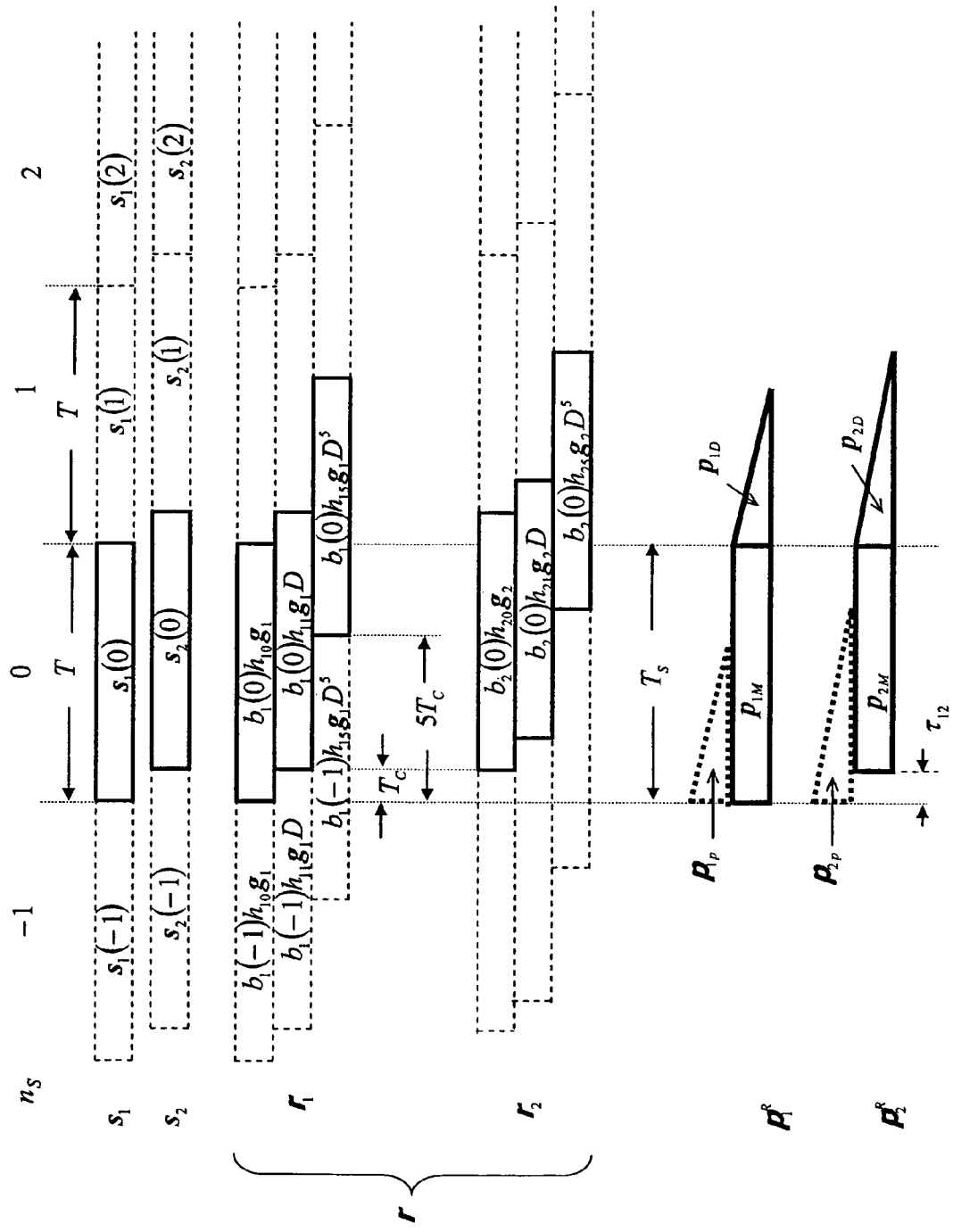
FIG. 7 is a time chart showing base-band transmit-/receive-symbol-sequences and pilot-responses.

FIG. 7 is an auxiliary explanatory diagram of the third embodiment, showing a time chart of base-band transmit- and receive-symbol-sequences with pilot-responses. Two upper rows in FIG. 7 show transmit-symbol-sequences $s_k(n_s)$ from respective users $u_k$(k=1, 2) with a symbol-period T and a symbol number $n_s$=(...-1, 0, 1, 2, ...). Below these rows, a receive-data-symbol r is shown classified by multi-path-components. $r_k$ is the k-th user specific receive-wave component corresponding to $s_k$. In this example, the receive-wave component of each user consists of three waves, i.e., a direct wave, a $T_c$ (chip period) delayed wave, and a $5T_c$ delayed wave.

The direct wave component of the $n_s$=(0)-th receive-symbol is represented by $b_k(0)h_{k0}g_k$. Where $g_k$ denotes a spreading-sequence of $u_k$. With a delayed operator D, the components of the $T_c$ and $5T_c$ delayed waves are expressed as $b_k(0)h_{k1}g_k D$ and $b_k(0)h_{k5}g_k D^5$, respectively. Here, $b_k(n_s)$ denotes the $(n_s)$-th data transmitted by user $u_k$, and $h_{kj}$(J=0, 1, 2 ...) is the j-th component of a channel vector $h_k$ from $u_k$ to the receiver. The receiver extracts a sum of all the components (in this example, 6 waves) contained in the $n_s$-th receive-data-symbol r over a time position $T_s$ (equal to symbol period T) and demodulates it in the symbol base. Period $T_s$ includes the direct wave of a current symbol of interest and delayed-wave components of a preceding symbol.

It is assumed that only the transmitter of $u_1$ sends a pilot-symbol $s_{P1}$ to the 0-th symbol position (period T, $n_s$=0) and does not send data or other pilot-symbols before and after the symbol position. Corresponding to $s_{P1}$, as shown in the second bottom row, the receiver receives a pilot-response $P_1^R$ which is a component enclosed by the real bulk frame. Since pilot-response $P_1^R$ spreads over two-symbol-periods by the multi-path wave components. These components over symbol-timing zones of $n_s$=0 and $n_s$=1 are expressed as $p_{1M}$ and $P_{1D}$, respectively. ($p_{1p}$ indicated by a dotted line denotes a delayed wave generated by an assumed preceding pilot, corresponding ti $P_{1D}$.) Thus, response $P_1^R$ is a receive-response when transmitting three transmit-data-symbols by setting as $b_1(0)=p=1$ and $b_1(-1)=b_1(1)=0$. (p denotes a pilot-information) Response $P_2^R$ is a receive-response when a pilot is transmitted from the second user $u_2$. (In general, in order to prevent $P_1{}^R$ and $P_2{}^R$ from being simultaneously received, their transmit-timings are controlled.)

Figure 8:
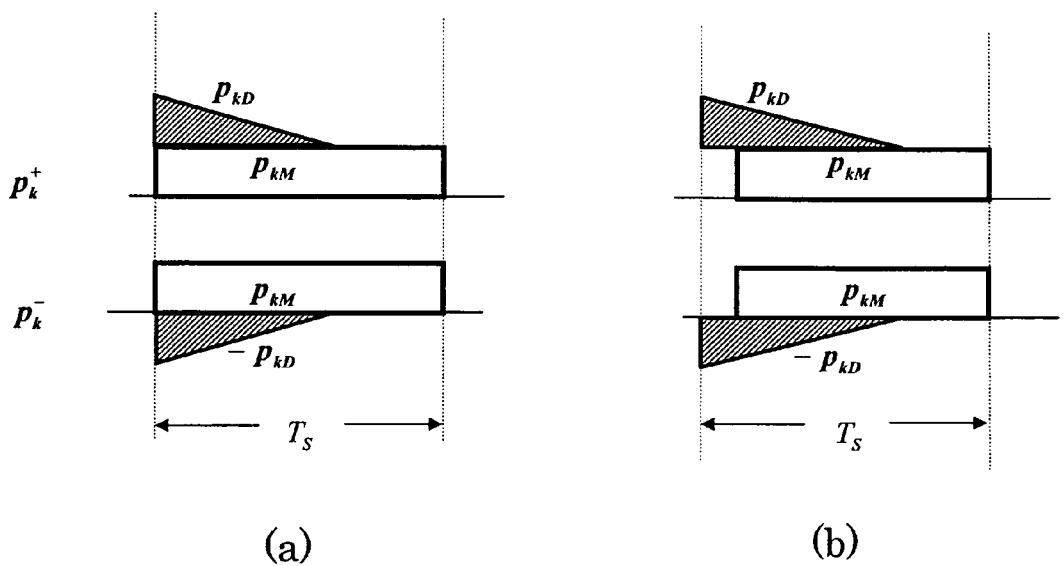
FIGS. 8(*a*) and 8(*b*) are diagram showing a method of generating positive/negative pilot-response-vectors.

FIG. 8 is an explanatory diagram of the third embodiment of the present invention, showing a model diagram of pilot-responses.

In general, on an assumption that J multi-path-waves are received per transmit-symbol as a pilot-response, a receive-response is given by the following equation:

$$p_k^R = \sum_{j=0}^{J-1} h_{kj} g_k D^j \tag{43}$$

When a receive-symbol-synchronized position at the receiver is fixed to period $T_s$, as shown in FIG. 8, response $p^R{}_k$ consists of a main response $p_{kM}$ on the current symbol-period and a delayed response $P_{kD}$ on a subsequent symbol-period.

The components of receive-data-symbol $r_1(0)$ over the $n_s=0$-th slot shown in FIG. 8 is given by:

$$r_1(0)=b_1(0)p_{1M}+b_1(-1)p_{1D} \tag{44}$$

There are four combinations of two data $b_1(0)$ and $b_1(-1)$, if binary transmit-data is assumed. Let's use a combination of synthesized pilot-responses made by two element-responses for user $u_k$ as shown in FIG. 8(*a*). This combination is given by the following equations.

$$p_k{}^+ = p_{kM} + p_{kD} = (p_{k1}{}^+, p_{k2}{}^+, \ldots, p_{kL}{}^+)$$

$$p_k{}^- = p_{kM} - p_{kD} = (p_{k1}{}^-, p_{k2}{}^-, \ldots, p_{kL}{}^-) \tag{45}$$

Therefore, the $(n_s)$-th receive-symbol $r_k(n_s)$ received from user $u_k$ can be expressed as follows:

$$r_k(n_S)=b_k{}^+(n_S)p_k{}^++b_k{}^-(n_S)p_k{}^- \ (b_k{}^+,b_k{}^-\in +1,-1,0) \tag{46}$$

More specifically, when a combination, i.e., one pair of synthesized pilot-responses $p^+{}_k$ and $p^-{}_k$ are prepared, these responses include preceding symbol components. For this reason, a data-response can be analyzed without being subjected to an interference (ISI) due to a preceding symbol. For a synchronized position of the receive-symbol over period $T_s$, the pilot-response received from user $u_2$ is delayed by $\tau_{12}$ in case of FIG. 7. In this case, the pilot-response is generated as a sum of components as shown in FIG. 8(*b*).

In FIG. 8, an inter-user deviation $\tau_{kk'}$ ($\tau_{kk'}$ is an integer obtained by normalizing by $T_C$) of the pilot-responses (as indicated by $\tau_{12}$) must satisfy the following equation if a synchronous or quasi-synchronous reception is assumed.

$$\tau_{kk'}+(J-1)\leq L \ (k\neq k') \tag{47}$$

Under the condition, the spreading range of pilot-response $p^R{}_k$ is limited within a 2 symbol time-slot. [If $p^R{}_k$ spreads in an $n_p$ symbol-slots, a combination of synthesized pilot-responses of $2^{n_p-1}$ types should be prepared, instead of two types in the above example.]

In the example in FIG. 7, a system of user-separating equations for a receive-symbol $r$ at position $T_s$ can be expressed by the following equations, by using the same method as that in Eq.(11-A), with 2K synthesized pilot-responses.

$$r = Pb + x \tag{48}$$
$$[L\times 1] \ [L\times 2K][2K\times 1] \ [L\times 1]$$

$$\begin{aligned} r &= [r_1, r_2, \ldots, r_L]^T \\ P &= [p_1^+, p_2^+, \ldots p_K^+, p_1^-, p_2^-, \ldots p_K^-] \\ b &= (b^+ + b^-) = [b_1^+, b_2^+, \ldots b_K^+, b_1^-, b_2^-, \ldots b_K^-]^T \\ x &= [x_1, x_2, \ldots, x_L]^T \end{aligned} \tag{49}$$

A soft-output-vector $\tilde{b}$ is obtained by solving Eq.(48) with respect to $b$ as in Eqs.(12) to (15).

The components of a data vector $b(n_S)$ of the $(n_S)$-th transmit-symbol are contained in not only a soft-output-vector $\tilde{b}(n_S)$ that is a solution for the $(n_S)$-th receive-symbol, but also a soft-output-vector $\tilde{b}(n_S+1)$ of the subsequent receive-symbol. Therefore, concerned with the data components of user $u_k$, the following relationship is satisfied:

$$\tilde{b}_k(n_S)=\tilde{b}_k{}^+(n_S)+\tilde{b}_k{}^-(n_S)+\tilde{b}_k{}^+(n_S+1)-\tilde{b}_k{}^-(n_S+1) \tag{50}$$

Accordingly, a data-corresponding soft-output can be calculated from a sum of two element soft-outputs obtained over two receive-symbols.

When a solution is calculated by a system of linear equations of a conventional DD or MMSE system, such as expressed by Eq.(15), the solution is given by $\tilde{b}_k(n_S)=b_k(n_S)+\Delta b_k(n_S)$. Now, signal related elements which carry data $b_k(n_s)$ in receive-vector $r$ in FIG. 7 are four components, i.e., $p_{kM}(n_s)$, $p_{kD}(n_s)$, $p_{kM}(n_s+1)$, and $p_{kD}(n_s+1)$. For the simplicity, let's be an average voltage amplitude of vectors of these element components, $T$ be a period of time, and $E$ be energy. All the values are equal to each other. On the other hand, when projecting white noise components $x$(AWGN) included in $r$ to main and delayed components $p_{kM}$ and $P_{kD}$ are represented by $x/p_{kM}$ and $x/p_{kD}$ respectively, a projected voltage component of $x$ included in the right-hand side of Eq.(45) is given by $[x/p_{kM}+x/p_{kD}]$. Since the above-described two noises are not correlated to each other, all noise power is equal to a power-sum of the noises. When an average voltage amplitude of the noises is expressed by $E|x/p_{kM}|=E|x/p_{kD}|=|x_0|$, an SN ratio of a soft-output of Eq.(50) is given by the following equation:

$$SN_k = \frac{(4|s|)^2}{2|x_0|^2} = \frac{8|s|^2}{|x_0|^2} = \frac{8E}{N_0} \tag{51}$$

When an enveloped sequence with the guard sequences in FIG. 3 is used, in the above explanation, $p_{kD}=0$ is established, and two symbol outputs cannot be used. For this reason, it should result an unfavorable relation $SN_k=s^2/x_0|^2$. Accordingly, an increase in S/N ratio is achieved by using the combined pilot.

It is assumed that the multi-path propagation-characteristics shown in FIG. 7 is suddenly lost due to a change in the environment. In this case, the receiver always analyzes a known pilot-response, energies $E_{kM}$ and $E_{kD}$ of a main response and a delayed wave response are compared with each other. If the following equation holds good, $$E_{kM} \gg E_{kD} \tag{52}$$

the k-th pair of element vectors in matrix P in Eq.(48), is given by the following equation:

$$p_k^+ \cong p_k^- \tag{53}$$

For this reason, the regularity of the matrix P is considerably deteriorated. As a result, noise included in the soft-output-vector considerably increases.

For possible deterioration in the regularity of matrix P, an adaptive demodulation-function should be provided for a receiver. When the state described above is detected, the receiver forces to set, $p_{kD}=0$, $p^+_k=p_{kM}$, and $p^-_k=0$ in Eq.(45) to reduce the size of matrix P in Eq.(49) to L×(2K−1), reducing the size of a vector b to (2K−1)×1 by removing $b^-_k$ from vector b. And then it solves Eq.(48). Thus deterioration of regularity of matrix P can be avoided.

As the second means which does not especially require the change of the demodulating operation, an imitated delayed sequence system will be described below.

Figure 9:
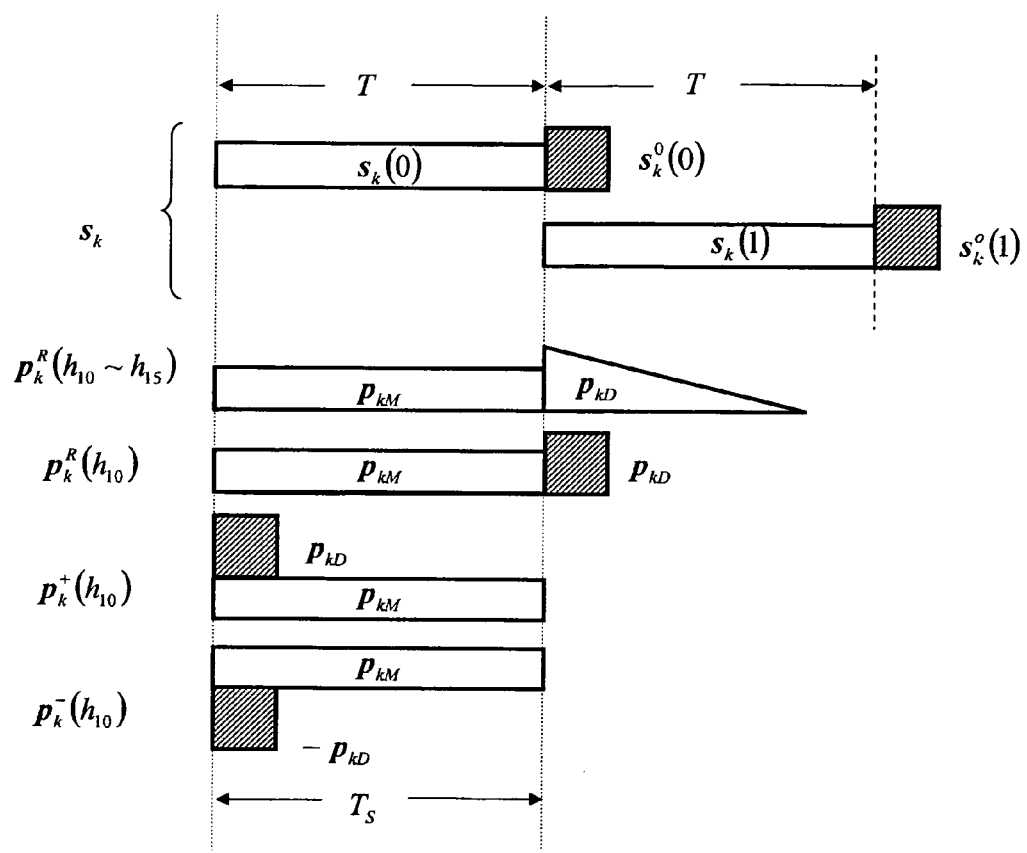
FIG. 9 is a diagram showing transmit-symbols and pilot-responses of an imitated delayed wave transmission system.

FIG. 9 is an auxiliary explanatory diagram of the third embodiment of the present invention, showing a diagram of transmit-symbols and pilot-responses of the imitated delayed wave transmission system. The $n_s(=0, 1)$-th transmit-symbols $s_k(0)$ and $s_k(1)$ of the k-th user are shown in upper rows in FIG. 9. At the tails of these symbols, additional symbols $s^0_k(0)$ and $S^0_k(1)$ are added as imitated symbols to the tail outside of a symbol-period T allocated in advance. For this reason, an extended spreading-sequence is given by:

$$\hat{g}_k = (g_{k1}, g_{k2}, \ldots, g_{kL}, g_{k1}^o, g_{k2}^o, \ldots, g_{kV}^o) \tag{54}$$

A sequence with V chips arranged tail outside the symbol-period is added to core-sequence $g_k$ with L chips equivalent to the symbol-period as an imitated delayed sequence.

In the middle rows in FIG. 9, the same pilot-responses as in FIG. 7 are shown. $p^R_k(h_{10}$ to $h_{15})$ denotes a response constituted by six receive-waves, and $p^R_k(h_{10})$ denotes a response constituted by one receive-wave without delayed waves. (A waveform in FIG. 9 is modeled.)

The two bottom rows in FIG. 9 show a combination of synthesized pilot-responses expressed by Eq.(45) to cases in which there are no delayed wave.

Accordingly, even though there is no delayed wave, a relation $p^+_k \neq p^-_k$ is satisfied, and the regularity of matrix P can be avoided from being deteriorated. For this reason, the demodulating process can be directly applied to the de-correlating system to obtain the solution.

Since the V chips of a header part of a symbol $S_k(1)$ on a symbol period given to a slot $n_s=1$ in FIG. 9 has the same time zone as that of the V chips of a tail part of symbol $s^0_k(0)$ that is a preceding symbol, both the chips overlap, and the transmitter has to make a sum of both the chips, and then transmit the sum. Let us consider of a combination of $b_k(0)$ and $b_k(1)$, such that the V chips of the both symbols may be partially or entirely canceled out by the summing. For this reason, in order to avoid a transmit-signal from being attenuated a sequence $\hat{g}_k$ in Eq.(54) is desirably designed by a means which gives, for example, real amplitude to chips of $gk_1$ to $g_{kv}$, and imaginary amplitude to chips of $g^0_{k1}$ to $g^0_{kV}$ so that both the V chip sequences become orthogonal to each other.

The fourth embodiment of the present invention is described below. The invention related to a multi-input multi-output (MIMO) CDMA system, provides a technique which achieves perfect inter-user interference separation to improve a diversity effect due to a number of input/output antennae.

Figure 10:
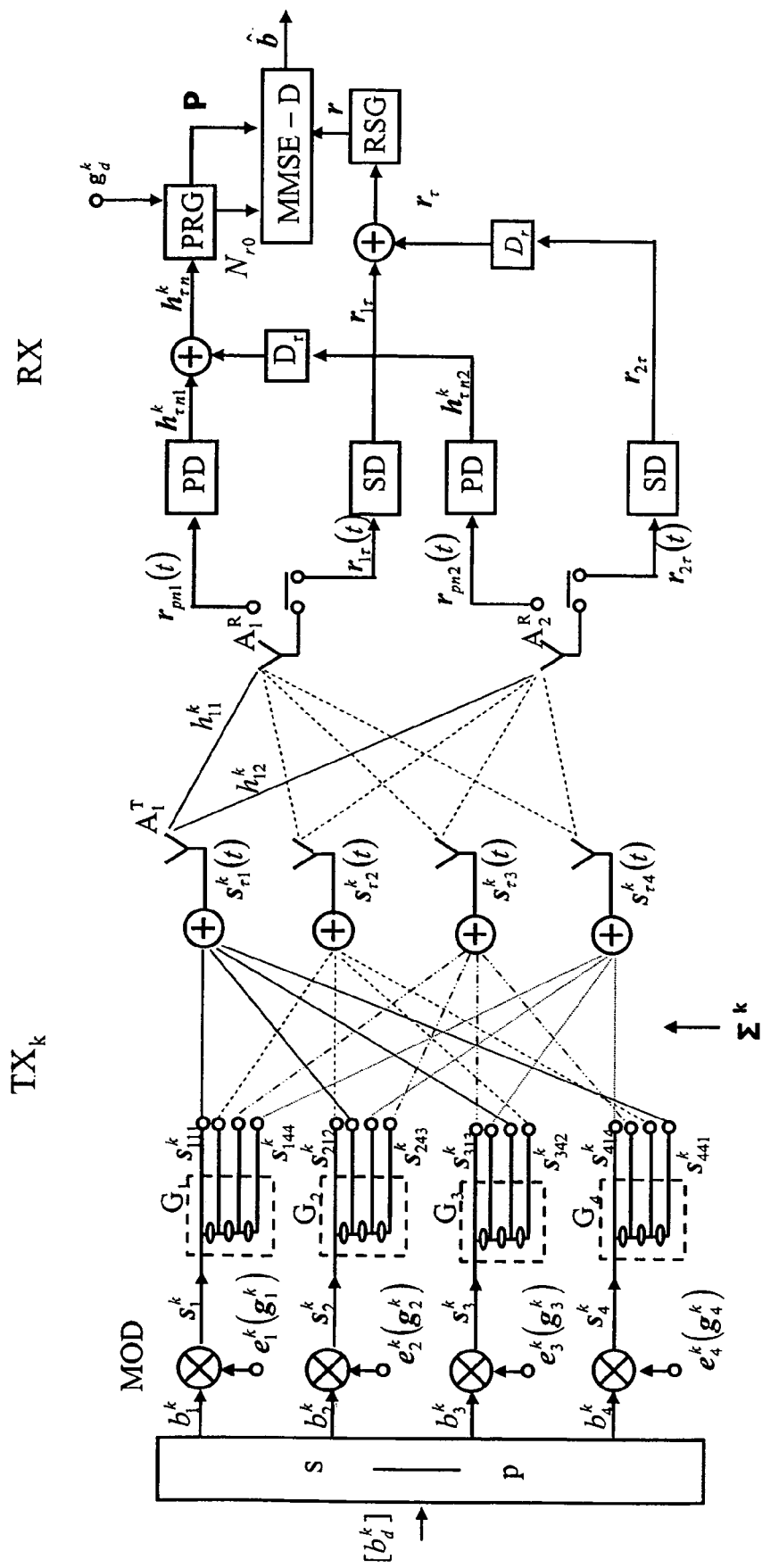
FIG. 10 is a block diagram of a multi-user transmitter/receiver using a space-time coding system.

FIG. 10 is a block diagram of a multi-input multi-output transceiver showing the fourth embodiment of the present invention. The transmitter $TX_k$ of the k-th user $u_k$ shown on the left in FIG. 10 transmits a space-time symbol-set $\Sigma^k$ arranged in 4×4 dimensions through N(=4) transmit-antennae $A^T_n$ (n=1, 2, . . . , N). Another transmitter $TX_{k'}$ of the k'(k'≠k)-th user (not shown) transmits a space-time symbol-set.

A transmit-data-sequence [$b^k_d$] (d=1, 2, . . . $N_d$ is an order number of data) of $u_k$ is converted into $N_d(=4)$ parallel data by a serial to parallel converter s-p. Respective $b^k_d$ of the data group consisting of the $N_d$ parallel data modulate at a modulator MOD the same enveloped sequence $e^k_d$ (including a core-sequence $g^k_d$ as an element) as shown in FIG. 3 to generate a base-band transmit-symbol $s^k_d$. Each symbol $s^k_d$ is applied to a space-time signal generator $G_d$. Space-time generator $G_d$ generates a symbol-sequence $s^k_{d\tau n}$ with a delayed element D, where lower scripts d, τ(=1, 2, . . . , $N_\tau$) and n denote adata-sequence-number, a time slot number, and a transmit-antenna number, respectively. Thus $N_d$ space-time symbol-set $\Sigma^k(s^k_{\tau n})$ is generated. Each symbol $s^k_{d\tau n}$ is given by the following equation:

$$s_{d\tau n}^k = b_{d\tau n}^k e_\tau^d \tag{55}$$

where a value $b^k_{d\tau n}$ depends on only number d. Symbols $s^k_{d\tau n}$, $s^k_{d'\tau n}$, $s^k_{d''\tau n}$ . . . in which τ and n are equal to each other is synthesized into a transmit-symbol $s^k_{\tau n}(t)$ by a summing gate SU. Transmit-symbol $s^k_{\tau n}(t)$ [The transmit-symbol is assumed as an output generated by modulating a chip-waveform q(t) expressed in Eq.(1) and a carrier-wave] is sequentially transmitted from the n-th antenna $A^T_n$.

The receiver RX is described below. A recieve-symbol $r_{pnm}(t)[r_{m\tau}(t)]$ received at a pilot [data] transmit-timing via the m-th (m=1, 2, . . . , M, and M=2 in FIG. 10) receive-antenna $A^m_R$ is applied to a pilot demodulator PD [data demodulator SD] where, a base-band channel gain (vector)$h^k_{\tau nm}$[ a base-band data-symbol (vector)$r_{m\tau}$] is generated.

These base-band-siymbols are connected in series with each other through a delaying element $D_r$ with one symbol-period ($T_E$) to obtain a synthesized pilot-response $h^k_{\tau n}$ (vector) and a synthesized data-symbol (vector) $r_\tau$. $N_\tau$ pieces of data-symbols $r_\tau$ are applied to a receive-symbol generator RSG which a generates a receive-symbol given by the following equation.

$$r = \sum_{\tau=1}^{N_\tau} r_\tau D_r^{\tau-1} \tag{56}$$

where $D_r$ is a delaying operator of one symbol.

On the other hand, a channel gain $h_{\tau n}^k$ is applied to a pilot-response generator PRG together with $N_d$ pieces of spreading-sequences $g^d_k$ used in each transmitter. Pilot-response generator PRG generates a pilot-response-matrix P, and estimates the power of AWGN included in a receive-symbol using receive-pilot-signals $r_{pnm}(t)$ as a noise power $N_{r0}$. A minimum-mean-square-error detector MMSE-D shown in FIG. 10 outputs a detected vector $\hat{b}$ with the circuit in FIG. 5 using receive-symbol r, pilot-response-matrix P, and noise power $N_{r0}$.

Figure 11:
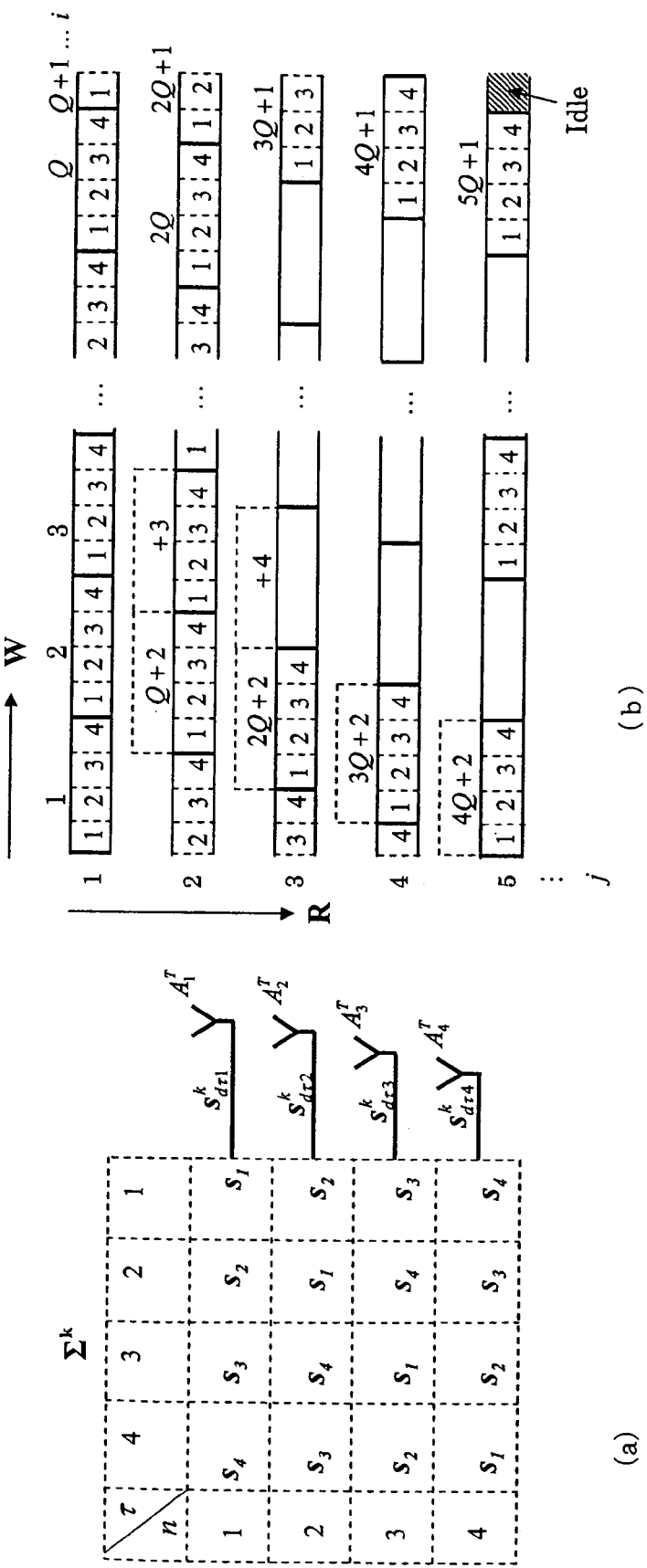
FIG. 11 are diagrams showing a signal generating model of the space-time coding system, in which FIG. 11(*a*) is an arrangement diagram of space-time symbols and FIG. 11(*b*) is a write-read order diagram for interleaving.

FIG. 11 is an auxiliary explanatory diagram for the fourth embodiment of the present invention, showing an arrangement diagram of a space-time symbol-set $\Sigma^k$ in a two-dimensional space consisting of a time axis τ, and a space axis n, for a case of $N_\tau=N=4$. Respective dotted-line frames determined by a transmit-timing τ and a transmit-antenna number n are allocated to the transmit-symbols $s_{d\tau n}^k$, where reference scripts k, n, and τ are omitted, and only symbol $s_d$ is shown. As a consequence, a symbol carrying d-th data is allocated to one of the time slots and one of the antennas only once. A conventional space-time coding technique uses a system which multiplies the symbols stated above by element code-words $c_{\tau n}$ of an orthogonal code c, to produce $c_{\tau n} s_{d\tau n}$ that is allocated to respective frames in FIG. 11. This conventional system provides communication for a single user as a target, and, produces each transmit-symbol by multiplying with codeword $c_{\tau n}$ and transmits it so that $N_d$ transmit-symbols can be completely separated from each other by a receiver. Thus, the receiver produces a sum output by linearly summing $N_\tau$ receive-symbols, and then applies the sum output to a matched filter matched to the d-th pilot-response to obtain the soft-output corresponding to the d-th symbol, separating the d-th symbol from the $N_d$ symbols. This technique has disadvantages such that it does not have a multi-user interference-separating function which is an object of present invention, and it requires an assumption that a channel-gain-characteristic should be constant during a period of $N_\tau$ receive-symbol-slots. For this reason, there is a problem such that a diversity function due to interleaving (will be described later) cannot be utilized for this system.

Let us explain a basic operation of receiver RX in FIG. 10. Pilot-demodulator PD generates a channel gain $h_{\tau nm}^k$ between transmit-/receive-antennae $A_n^T$ and $A_m^R$ which do not depend on a spreading-sequence used by the transmitters, using respective receive-pilot-symbols $r_{pnm}(t)$. Based on both a channel gain vector $h_n^k$ obtained by arranging $h_{\tau nm}^k$ in cascade and a spreading-sequence $g_d^k$ used by the k-th user for spreading of d-th data $b_d^k$, pilot-response for analyzing receive-symbol $s_{d\tau n}^k$ is produced, and it is represented by:

$$p_{d\tau n}^k = \sum_{m=1}^{M} p_{d\tau nm}^k D_S^{m-1} \tag{57}$$

$$p_{d\tau nm}^k = h_{\tau nm}^k [g_d^k]^T \tag{58}$$

With Eqs.(57) and (58), the same de-correlating equation as in Eq.(11) is obtained by the following equation:

where the matrix dimensions are described below the respective matrices. In order to obtain a solution, $K \leq 2L$ must be satisfied. In general, according to the dimensions $[N_\tau ML \times N_d K]$ of matrix P, the following expressions are obtained:

$$K \leq N_\tau ML/N_d \tag{60-A}$$

$$K \leq ML(N_\tau = N_d) \tag{60-B}$$

As long as the above equations are satisfied, Eq.(59) can be solved by a DD system having a capability of complete symbol separation and user separation. On the other hand, Eq.(59) can be solved with the MMSE-D systems, using the principles of the first and second embodiments of the present invention to obtain a soft-output vector so as to minimize a sum of included interference and white noise. As a result, a more excellent error rate characteristic can be obtained. More specifically, using the principles described above, highly-advanced user separation can be achieved.

In the explanation of the example described above, it is assumed that symbols $s_{d\tau n}^k$ carrying the same data $b_d^k$ are arranged on $N_\tau$ transmission time slots, and the transmission times of these time slots are adjacent to each other. However, when the above equation is to be solved, unlike in the conventional technology, the channel-gain-characteristics need not be invariant [$h_{\tau nm}^k$=constant] with respect to τ. Therefore, a time diversity technique with interleaving for overcoming a severe fading environment can be utilized as an effective means. This technique is explained with a practical example. In FIG. 11(a), four symbol sets transmitted over the τ-th time slot are expressed by:

$$S_{i\tau} = \left\{\sum_{n=1}^{4} s_{\tau n}\right\}_i = (s_{\tau 1}, s_{\tau 2}, s_{\tau 3}, s_{\tau 4})_i \tag{61}$$

where i denotes a sequential number of a group consisting of $N_d$ transmit-data. In the above example, $N_\tau$=4 time slots are allocated to the i-th combination, and N=4 symbols are transmitted over each of the time slots. Eq.(61) is the τ-th transmit- $$\left\{\begin{array}{c}
\begin{array}{cccc}
r= & Pb & + & x \\
(d & 1 & 2 & 3 & 4)
\end{array} \\
\tau \\
\begin{array}{c}1\\2\\3\\4\end{array}
\begin{pmatrix}r_1\\r_2\\r_3\\r_4\end{pmatrix}_{[N_\tau ML\times 1]}
=
\begin{bmatrix}
p_{111}^1 & p_{212}^1 & p_{313}^1 & p_{414}^1 \\
p_{122}^1 & p_{221}^1 & p_{324}^1 & p_{423}^1 \\
p_{133}^1 & p_{234}^1 & p_{331}^1 & p_{432}^1 \\
p_{144}^1 & p_{243}^1 & p_{342}^1 & p_{441}^1
\end{bmatrix}
\begin{bmatrix}p^2\\(u_2)\end{bmatrix}
\begin{bmatrix}p^3\\(u_3)\end{bmatrix}
\begin{bmatrix}p^4\\(u_4)\end{bmatrix}
\begin{pmatrix}b^1\\b^2\\b^3\\b^4\end{pmatrix}_{[N_d K\times 1]}
\begin{pmatrix}x_1\\x_2\\x_3\\x_3\end{pmatrix}_{[N_\tau ML\times 1]} \\
\underbrace{\phantom{xxxxxxxxxxxxxxxxx}}_{p^1(u_1)\ [N_\tau ML\times N_d K]} \\
r_\tau = (r_{\tau 1}, r_{\tau 2})^T,\ r_{\tau m} = (r_{\tau m1}, r_{\tau m2}, \ldots, r_{\tau mL})^T, \\
P^k = (p_1^k, p_2^k, p_3^k, p_4^k),\ p_d^k = (p_{d1n}^k, p_{d2n'}^k, p_{d3n''}^k, p_{d4n'''}^k)^T \\
p_{d\tau n}^k = (p_{d\tau n1}^k, p_{d\tau n2}^k)^T \\
b^k = (b_1^k, b_2^k, b_3^k, b_4^k)^T \\
x_\tau = (x_{\tau 11}, x_{\tau 12}, \ldots, x_{\tau 1L}, x_{\tau 21}, x_{\tau 22}, \ldots, x_{\tau 2L})^T
\end{array}\right\} \tag{59}$$

$$\begin{bmatrix} d=1,2,3,4;\ \tau=1,2,3,4; \\ m=1,2,\ n, n', n'', n''' \in 1 \sim 4,\ N_d = N_\tau = K = 4,\ M = 2 \end{bmatrix}$$

symbol set of the i-th combination. (An upper script k and a subscript d are omitted in the equation.)

FIG. 11(b) is a write/read arrangement diagram for interleaving, where transmit-symbol sets $S_{i\tau}$ are horizontally written in an order indicated by writing order W as i =1, 2, 3, ... Q, .... One set $S_{i\tau}$ takes $N_\tau$=4 time slots (1, 2, 3, and 4,). By repeating a method such that the writing process returns to the next line five times, whenever a symbol $S_{Q+1,1}$ has been written after writing of the Q-th set, the example shown in FIG. 11(b) is obtained. By reading out the symbol groups sequentially from the left with an order indicated by reading order R, symbols $[S_{11}]$, $S_{Q+1,2}$, $S_{2Q+1,3}$, $S_{3Q+1,4}$, and $S_{4Q+2,1}$ are obtained, continuing to $[S_{12}]$, $S_{Q+1,3}$, ... by changing the column to the right. This is an interleaved output. Symbol sets apart from each other by 4Q symbol periods are transmitted over adjacent time slots. In the receiver, a reverse operation (deinterleaving) of this writing/reading operation is performed. Thus, receive-symbol set $[R_{11}, R_{12}]$, ... corresponding to $[S_{11}, S_{12}]$, ... are sequentially arranged. Therefore, by substituting set $R_{11}$ to $R_{14}$ into symbols $r_1$ to $r_4$ in Eq.(59), a solution can be obtained. Consider the property of channel-gain-vectors $h^k_{\tau nm}$ featuring transmission process of receive-symbols $R_{11}$ to $R_{14}$. By the interleaving, actual time spacing between symbols with adjacent $\tau$ takes a value of 4QT. When Q is increased, almost no correlation can be achieved. For this reason, considerably improved anti-fading performance can be obtained.

When a coding technique using a known block code or a convolution-code is applied to the above system, the error rate can be further reduced. In this case, the transmitter performs encoding to an input data sequence $[b_d^K]$ in FIG. 10 in advance to perform the above-described spreading modulation for converting the sequence into data sequence $[b_d^{KC}]$ and then transmits coded data sequence $[b_d^{KC}]$. The receiver performs the above-described despreading demodulation for a receive-symbol-sequence to generate a decision output sequence $[\hat{b}_d^{KC}]$, and decodes decision output sequence $[\hat{b}_d^{KC}]$ to generate a detected data sequence $[\hat{b}_d^{KC}]$ corresponding to the original transmit-data-sequence. However, in the above technique according to the present invention, the same data has been in multiple times transmitted with $N_d(=N_\tau)$ symbols by using the space-time diversity, and an interleaving function is additionally applied. For this reason, the technique includes actually a function of coding. Therefore, in comparison with a single antenna transmission system using conventional coding or a conventional system without a sufficient user-separating function and an interleaving function, this invention can construct a system having a considerably excellent power bandwidth characteristic.

Since the embodiment as described above is based on the configuration of a MIMO system with M receive-antennae, the length of both the pilot vector and the receive-symbol-vector can be ML, if transmit-symbols with length L are used.

This fact means that the number of dimensions of signals increases M times, resulting in advantages such that the maximum number K of the users to be accommodated increased increases by a factor of M, and the noise reduces as little as 1/M. This principle can be applied to the first to fourth embodiments and the fifth embodiment (will be described later) to bring an advantageous effect such as to further reduce a power-bandwidth-product PB serving as an evaluating measure for these systems.

A CDMA transmission system using an orthogonal sequence-set according to the fifth embodiment of the present invention will be described below.

As an example of an orthogonal sequence-set, a complementary sequence-set will be described below. When a sequence-set of two sequence combinations of A ($A_1$, $A_2$) and B($B_1$, $B_2$), each consisting of a pair (in general, the number of powers of two) of the sequences with length L have a relationship expressed by the following four equations, this set is called a complete complementary sequence set.

$$R_{AA} = A_1 * \overline{A_1} + A_2 * \overline{A_2} = \sum_{n=0}^{L-1} \rho_{An}\delta(i-n)$$
$$R_{BB} = B_1 * \overline{B_1} + B_2 * \overline{B_2} = \sum_{n=0}^{L-1} \rho_{Bn}\delta(i-n)$$
$$R_{BA} = B_1 * \overline{A_1} + B_2 * \overline{A_2} = \sum_{n=0}^{L-1} \rho_{Cn}\delta(i-n)$$
$$R_{AB} = A_1 * \overline{B_1} + A_2 * \overline{B_2} = \sum_{n=0}^{L-1} \rho_{Dn}\delta(i-n)$$
(62)

$$\begin{aligned}\rho_{An} = \rho_{Bn} &= 2 \quad (n=0)\\ &= 0 \quad (n \neq 0)\\ \rho_{Cn} = \rho_{Dn} &= 2 \quad (n=0)\\ &= 0 \quad (n \neq 0)\end{aligned}$$
(63)

where *, -, and $\delta$ denote a periodical cross-correlation-function, a conjugate, and a delta function with a component variable i. n denotes a shift variable to indicate that the number of shifting a sequence is n. $\rho_{An}$ denotes the n-shift correlation, defined as a correlation between sequence $A_1$,($A_2$) and the n-shift sequence of sequence $\overline{A}_1$ ($\overline{A}_2$), that is the n-th (n=0,1 ... L−1) component of correlation-function $R_{AA}$. Therefore, it leads to $R_{AA}=(\rho_{A0}, \rho_{A1}, \ldots, \rho_{AL-1})$. As expressed in Eq.(63), let us use a sequence-set having both auto- and cross-orthogonal property except zero-shift auto-correlation. Although complete complementary sequence sets exist for a sequence length such as L=4, 8, 16, ..., an example of a sequence-set consisting of sequences having a binary amplitude (+, −) and a length L=4 is described below:

$$\begin{cases} A_1 = & + & + & + & - \\ A_2 = & + & - & + & + \end{cases} \begin{cases} B_1 = & + & + & - & + \\ B_2 = & + & - & - & - \end{cases}$$
(64)

Let us explain a composing method of transmit-symbols by using a combination of the orthogonal sequence pairs, and a receive-symbol components corresponding to the transmit-symbol.

Figure 12:
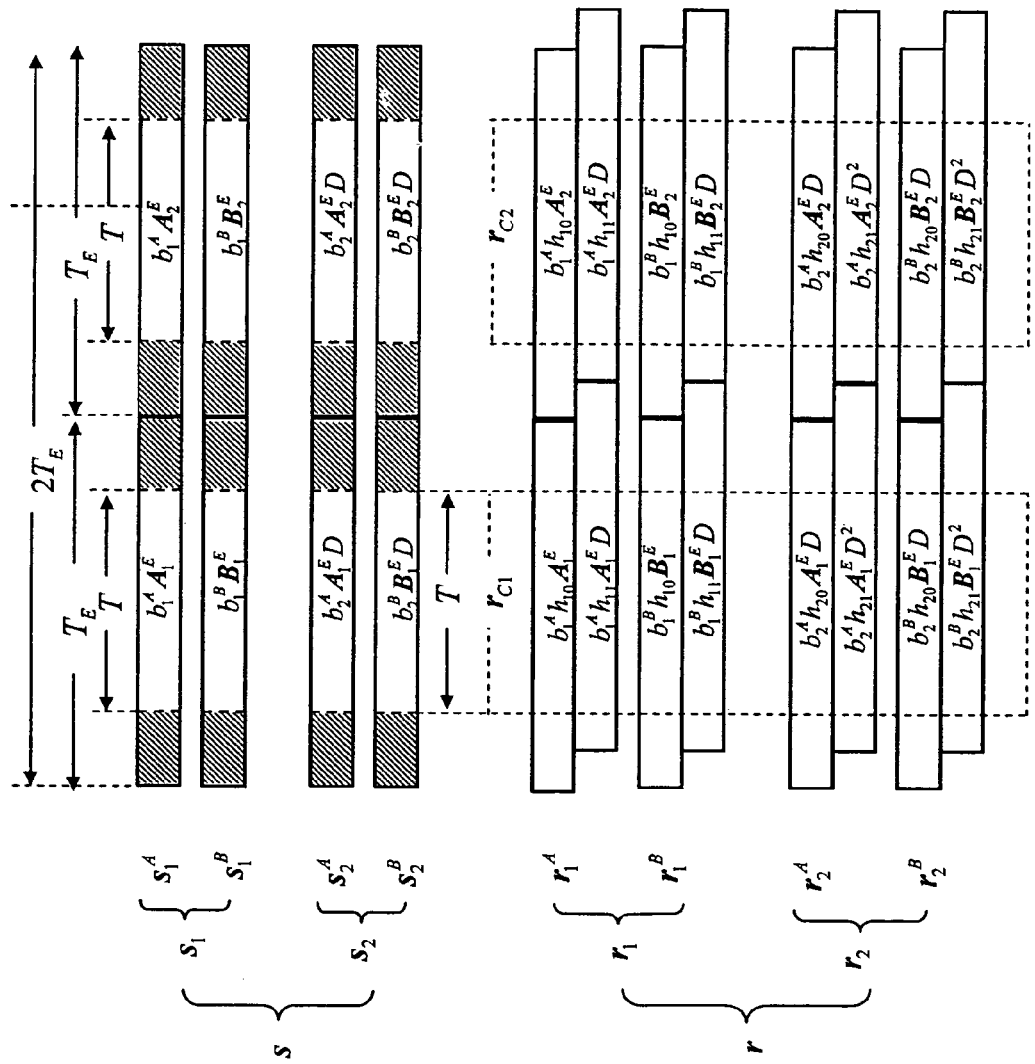
FIG. 12 is a time chart of transmit-/receive-symbols for a CDMA transmission system using complementary sequences.

FIG. 12 is an auxiliary explanatory diagram of the fifth embodiment of the present invention, showing a time chart of receive-/transmit-symbols using a complementary sequence-set in a CDMA system. The k-th user $u_k$ (k=1, 2) transmits 2-bit data ($b_k^A$, $b_k^B$) over a symbol period $2T_E$. Respective sequences $A_1^E$ to $B_2^E$ shown in the figure, denote enveloped (cyclic spreading) sequences with period $T_E$ which are made by enclosing respective core-sequences over period T, that are sequences $A_1$ to $B_2$, with guard sequences of hatched portions shown in the figure. [Since the rear and front parts of each core-sequence are used as the front and rear guard sequence, a partial sequence with the consecutive L chips (corresponding to period T) of the enveloped sequence becomes a cyclic shift sequence of the core-sequence.] The enveloped sequence pair is multiplied by a data to produce a transmit-sub-symbol $s_1^A$ that is represented as:

$$s_1^A = b_1^A(A_1^E \oplus A_2^E)$$
(65)

where ⊕ denotes a notation to arrange sequences $A_1^E$ and $A_2^E$ in cascade. A transmit-symbol of user $u_1$ is given by an arithmetic sum (addition in chip-element wise) of sub-symbols $s_1^A$ and $s_1^B$, where $s_1^B$ is made by the same method as that of producing $s_1^A$.

$$s_1 = s_1^A + s_1^B = (b_1^A A_1^E + b_1^B B_1^E) \oplus (b_1^A A_2^E + b_1^B B_2^E) \quad (66)$$

Although the components of $A_1^E$ and $B_1^E$ are summed up and then transmitted, these components can be separated and detected by a receiver due to the orthogonality between them. A transmit-symbol expressed by the following equation is generated for $u_2$ by the same method as described above.

$$s_2 = s_2^A + s_2^B = (b_2^A A_1^E + b_2^B B_1^E) \oplus (b_2^A A_2^E + b_2^B B_2^B) \quad (67)$$

where, D denotes a delay-operator by one chip. More specifically, symbol $s_2$ is composed of an enveloped sequence pair which is made using core-sequences obtained by shifting the core-sequences used for $s_1$ by one chip.

Let us consider synchronous reception in which these transmit-symbols arrive at the receiver at the same time. In FIG. 12, a user specific receive-symbol component corresponding to a transmit-symbol $s_k$ is shown as $r_k(r_k^A, r_k^B)$. For convenience, FIG. 12 shows cases in which each receive-symbol consists of a direct wave component ($h_{10}$) and one delayed wave component ($h_{11}$) [The channel is assumed to be $h_1 = (h_{10}, h_{11})$]. Accordingly, a receive-symbol $r_1^A$ has transmit-symbol ($s_1^A$) related components, and is given by the following equation, by assuming AWGN included in $r_1^A$ to be 0:

$$r_1^A = b_1^A (h_{10} A_1^E + h_{11} A_1^E D) \oplus b_1^A (h_{10} A_2^E + h_{11} A_2^E D) \quad (68)$$

A delayed wave component of sequence $A_1^E$ by n chips is represented as sequence $A_1^E D^n$, that is obtained by multiplying the enveloped sequence by a delayed operator $D^n$. A core-portion $[r_1^A]_{C1}$ extracted from a front part of receive-symbol $r_1^A$ is applied to a matched filter $MF(A_1)$ matched to sequence $A_1$, and a core-portion $[r_1^A]_{C2}$ extracted from a rear part of the receive-symbol is applied to another filter $MF(A_2)$, and then a sum of both the correlated outputs is obtained. From the relationship of Eq.(63), the sum is represented as:

$$y_{10}^A = [r_1^A]_{C1} \overline{A_1} + [r_1^A]_{C2} \overline{A_2} = b_1^A h_{10} \quad (69)$$

A receive-symbol $r_1^B$ corresponding to a transmit-symbol $s_1^B$ is given by the following equation based on Eq.(68):

$$r_1^B = b_1^B (h_{10} B_1^E + h_{11} B_1^E D) \oplus b_1^B (h_{10} B_2^E + h_{11} B_2^E D) \quad (70)$$

Since core-portion-sets $[r_1^B]_{C1}$, $[r_1^B]_{C2}$ and $[r_1^A]_{C1}$, $[r_1^B]_{C2}$ are orthogonal to each other according to Eq.(63), even though $[r_1]_{C1}$, $[r_1]_{C2}$ are used in place of $[r_1^A]_{C1}$, $[r_1^A]_{C2}$ in Eq.(69), an output $y_{10}^A$ from the filter does not change. Therefore, the following equation holds good:

$$y_{10}^A = [r_1^A]_{C1} \overline{A_1} + [r_2^A]_{C2} \overline{A_2} = b_1^A h_{10} \quad (71)$$

When two equal symbol components are applied to filters $MF(A_1 D)$ and $MF(A_2 D)$ matched to a delayed sequence, the following equation holds good:

$$y_{11}^A = [r_1]_{C1} \overline{A_1 D} + [r_1]_{C2} \overline{A_2 D} = b_1^A h_{11} \quad (72)$$

If a receive-symbol $r_2$ is applied to matched filters $MF(A_1 D)$ to $MF(B_2 D^2)$ by the same method as described above, the correlated outputs are represented as:

$$\left. \begin{array}{l} y_{20}^A = [r_2]_{C1} \overline{A_1 D} + [r_2]_{C2} \overline{A_2 D} = b_2^A h_{20} \\ y_{21}^A = [r_2]_{C1} \overline{A_1 D^2} + [r_2]_{C2} \overline{A_2 D^2} = b_2^A h_{21} \end{array} \right\} \quad (73)$$

In general, the j-th delayed wave related correlated output obtained with a receive-symbol from the k-th user $u_k$ is given by the following equation:

$$\left. \begin{array}{l} y_{kj}^A = [r_k]_{C1} \overline{A_1 D^{k-1+j}} + [r_k]_{C2} \overline{A_2 D^{k-1+j}} = b_k^A h_{kj} \\ y_{kj}^B = [r_k]_{C1} \overline{B_1 D^{k-1+j}} + [r_k]_{C2} \overline{B_2 D^{k-1+j}} = b_k^B h_{kj} \end{array} \right\} \quad (74)$$

In general, the following equation holds good for a multiplexed receive-symbol including all the user-symbol-components, $$r = \sum_{k=1}^{K} r_k + x \quad (75)$$

When core-portions $r_{c1}$ and $r_{c2}$ (see FIG. 12) which are included in the front and rear parts of a multiplexed receive-symbol are applied to matched filters $MF(A_1 D^1)$ and $MF(A_2 D^1)$, respectively, correlated output vectors containing AWGN x are given by the following equations.

$$\left. \begin{array}{l} y_l^A = r_{C1} \overline{A_1 D^{l-1}} + r_{C2} \overline{A_2 D^{l-1}} + x \\ y_l^B = r_{C1} \overline{B_1 D^{l-1}} + r_{C2} \overline{B_2 D^{l-1}} + x \end{array} \right\} \quad (l = 1, 2, \ldots, L) \quad (76)$$

As a consequence, the following equation holds good by referring to Eqs.(74) to (76).

$$H\tilde{b}^A = y^A \quad (77)$$

$$\begin{pmatrix} h_{10} & 0 & \cdots & h_{K-1,J-2} & h_{K,J-1} \\ h_{11} & h_{20} & \cdots & h_{K-1,J-1} & 0 \\ h_{12} & h_{21} & & 0 & \vdots \\ \vdots & \vdots & & 0 & \vdots \\ h_{1,J-1} & \vdots & & h_{K-1,0} & 0 \\ 0 & h_{2,J-1} & \cdots & h_{K-1,l} & h_{K,0} \\ \vdots & 0 & & \vdots & h_{K,1} \\ \vdots & \vdots & & \vdots & \vdots \\ 0 & 0 & & h_{K-1,J-3} & h_{K,J-2} \end{pmatrix} \begin{pmatrix} \tilde{b}_1^A \\ \tilde{b}_2^A \\ \vdots \\ \vdots \\ \vdots \\ \vdots \\ \vdots \\ \tilde{b}_K^A \end{pmatrix} = \begin{pmatrix} y_1^A \\ y_2^A \\ \vdots \\ \vdots \\ \vdots \\ \vdots \\ \vdots \\ y_L^A \end{pmatrix}$$

where, a channel gain vector is given by $h_k = (h_{k0}, h_{k1}, \ldots, h_{k,J-1})$, and the number of users is given by $K \leq L$. Similarly, for a receive-symbol component using a sequence-set B, the following equation holds good:

$$H\tilde{b}^B = y^B \quad (78)$$

These systems of linear equations can be solved with respect to $\tilde{b}^A$ and $\tilde{b}^B$ by using the first and second embodiments, so that data of $K(\leq L)$ users, each consisting of two bits, can be obtained. More specifically, when $K = L$ is satisfied by using two core-sequences having 2L chips, the maximum data rate can be 2L bits per symbol. For this reason, high frequency-utilization-efficiency can be obtained.

In the above equation, since a diagonal component of matrix H corresponds to a dominant wave, as long as the amplitude of the dominant wave is large (when some dominant waves have a small amplitude, the transmit-timings of these users are controlled from a base-station, so that the dominant waves can shift to large-amplitude delayed waves), the regularity of matrix H can be kept high. Therefore, low error rate characteristics can be obtained without being easily disturbed by noise.

Figure 13:
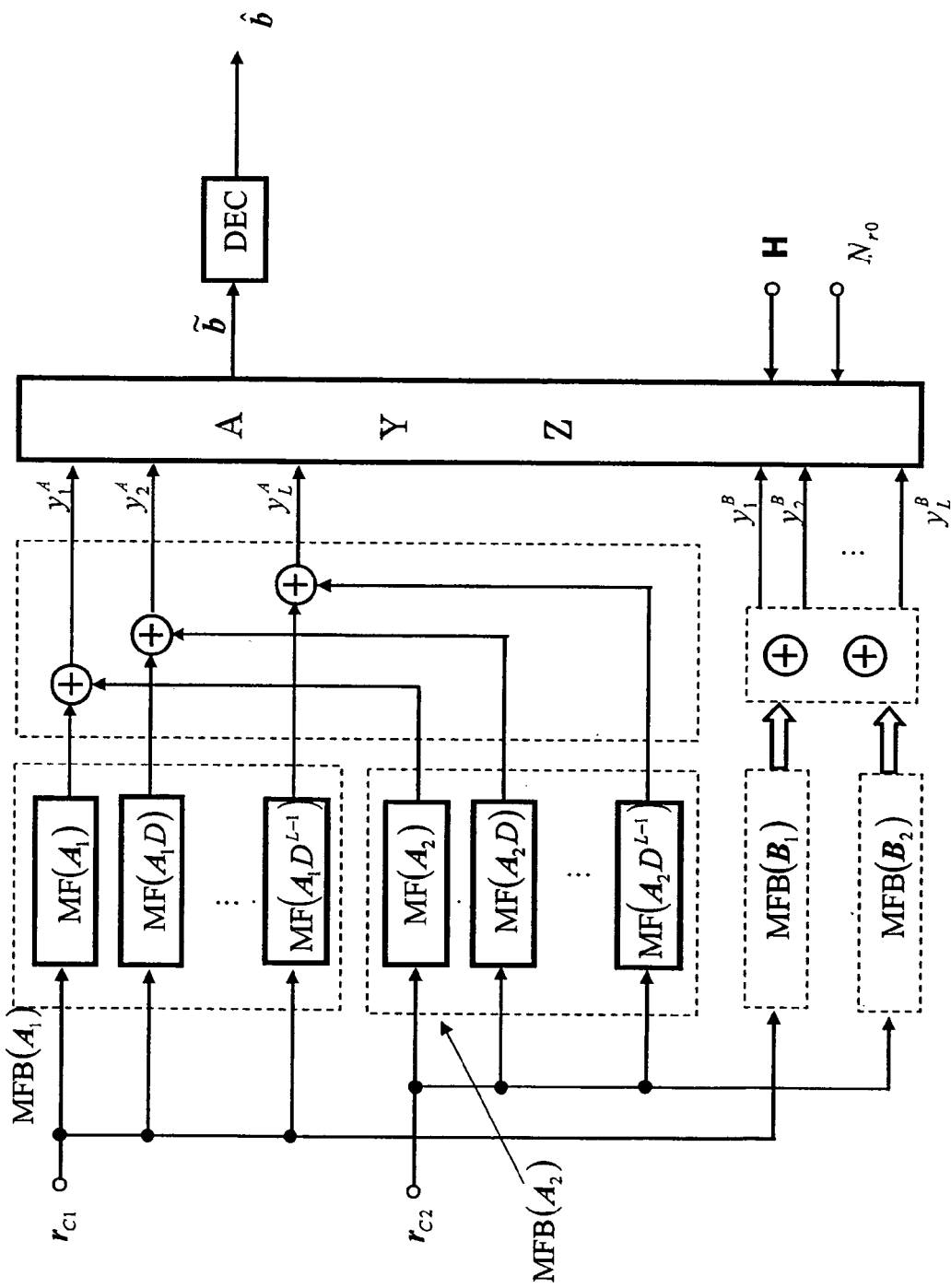
FIG. 13 is a block diagram of a receiver of a CDMA transmission system using complementary sequences.

FIG. 13 is a block diagram of a receiver demodulating circuit according to the fifth embodiment of the present invention. The receive-symbols $r_{c1}$ and $r_{c2}$ shown in FIG. 12 are applied to matched filter banks $MFB(A_1)$ and $MFB(A_2)$, respectively. Matched filters $MF(A_1 D^{l-1})$, and $MF(A_2 D^{l-1})$ (l=1,2,...,L) in these banks generate correlation outputs and generates an output in Eq.(76) through a subsequent summing circuit (SU). A soft-output-vector. $y^A = (y^A_1, y^A_2, \ldots, y^A_L)$, channel gain matrix H obtained by the pilot transmission in advance, and a noise power $N_{r0}$ on the receive-symbol are applied to an analyzer AYZ. Analyzer AYZ generates a soft-output vector $\tilde{b}^A$ by using the circuit in FIG. 5 or 6.

The receive-symbol is also applied to matched filter banks $MFB(B_1)$ and $MFB(B_2)$ the same as the above matched filter banks. These outputs are applied to analyzer AYZ to generate a soft-output-vector $\tilde{b}^B$. A decision circuit DEC makes hard decisions on respective components of these soft-output vectors to obtain a detected data-vector $\tilde{b}$ with 2K-bit transmit-data.

As the maximum advantage of this system, Since a transmit-symbol is constituted of two sub-symbols made of sequence-sets A and B, the maximum peak transmit-power is four times larger than an element power of a system using only one symbol. On the other hand, in the conventional system, each user transmits a synthesized symbol which is made by summing up 2L sub-symbols composed of $AD^l$ and $BD^l$ (l=0, 1, 2, ..., L−1), each uses one chip more delayed sequence than the sequence used by preceding one, to reduce a frequency band. This conventional system must be tolerate to the maximum peak transmit-power $(2L)^2$ times larger than the element power. However, the present invention provides a technique which avoids the above problem.

In the above explanation, synchronous reception is assumed. However, actually, even in quasi-synchronous reception, almost the same operation is performed. This is because, if a spreading-sequence used for a user $u_k$ is represented by $AD^n$ and a position of a corresponding receive-symbol is delayed by 1 chip, a dominant wave and a j-chip delayed wave of the user specific receive-component is constituted by $AD^{n+1}$ and $AD^{n+j+1}$. As a result, the position of the k-th column vector $h^k$ of matrix H in Eq.(77) is shifted to the next lower stage, and the diagonal component of matrix H includes 0. This degrades the regularity of matrix H. In this case, when a synchronized position of a receive-symbol is set at a position delayed by one chip, the matrix H has a configuration such that $h^{k'}(k' \neq k)$ is shifted to the next upper stage without changing $h^k$. As a result, the problem of a diagonal component including 0 can be easily avoided.

In the above explanation, a complementary sequence-set is used as an orthogonal sequence-set. As another orthogonal sequence-set to be used for the present invention, there is a zero correction zone sequence-set (ZCZ). An example of a ZCZ sequence-set having a sequence length L=8 is described below:

$$a_0 = (+ \ + \ + \ + \ - \ + \ - \ +) \atop a_1 = (+ \ + \ - \ - \ - \ + \ + \ -) \atop a_2 = (- \ + \ - \ + \ + \ + \ + \ +) \atop a_3 = (- \ + \ + \ - \ + \ + \ - \ -)$$ (79)

This example is constituted of four sequences for a family size M=4. A cyclic cross-correlation-function is given by:

$$\rho_{pq}(n) = \frac{1}{L} \sum_{i=0}^{L-1} a_p(i) a_q(i-n) \quad (p, q \in 0,1,2,3) \atop = 1 \quad (p = q, n = 0) \atop = 0 \quad (p = q, |n| \leq \Delta, n \neq 0) \atop = 0 \quad (p \neq q, |n| \leq \Delta)$$ (80)

where $\Delta$ denotes a zero correlation zone. In the above example, $\Delta=1$ is satisfied. Consider a set $S_z$ constituted of L sequences ($a_1$ to $a_4$) belonging to a ZCZ sequence-set, and one-chip shifted sequence-set ($a_1 D$ to $a_4 D$) and ($a_1 D^{-1}$ to $a_4 D^{-2}$). Any of cross-correlation between two arbitrary sequences in $S_z$ takes 0. Therefore, each sequence of set $S_z$ is allocated to each user, and the single sequence is used in place of a sequence pair obtained by shifting the complementary sequence pair ($A_1, A_2$) by an arbitrary number of shifts, so that the same system as the system using the complementary sequence-set can be constructed. Since a system of a K(=L) user can be designed by using a set having a sequence length L, the same frequency-utilization-efficiency as that the method using the complementary sequence-set can be achieved. For the same reason, a ZCZ sequence using complex or ternary values can be used for this purpose.

Conventionally, for user separation, a system using rows of an Hadamard matrix (Walsh function), so-called an orthogonal sequence, as spreading sequences has been practically used. For sequences p and q belonging to an Hadamard sequence-set, the n-shift auto-correlation takes a value of $\rho_{pp}(n) \neq 0$ (n≠0), and the n-shift cross-correlation takes a value of $\rho_{pq}(n) \neq 0$ (n≠0). More specifically, since shift correlation values of auto- and cross-correlation-functions take large values, this characteristic deteriorates the regularity of matrix H given by Eq.(77), resulting in degrading user-separating functions.

In contrast, the fifth embodiment of the present invention can completely remove the degradation, realize excellent user-separating characteristics, and reduce a power-bandwidth-product PB.

In the first to fifth embodiments, complete user separation or symbol separation can be performed by system MMSE-D described in the first to fifth embodiments. However, even though a DD system in which $N_r=0$ is set in Eq.(14), the same purpose can be accomplished. By designing the number K of users less than the core-sequence length (real spreading factor) L by a small percentage, system DD exhibits preferable characteristics with a satisfactory low error rate.

An efficient pilot transmission system according to the sixth embodiment of the present invention is described below. A base-station needs to acquire channel-gain-characteristics from each user to the base-station. Therefore, each user must transmit its pilot-symbol to the base-station at frequent times considerably higher than a Doppler shift. If each user transmits the pilot in a time zone different from that of pilot transmission and data transmission of other users, so that the receiver need to receive the pilot-symbol from each user without being subjected to interference and generate a sufficient correct pilot-response.

Furthermore, since one pilot-symbol generally includes large white noise (AWGN), a method which receives a plurality (N) of pilot-symbols within a short period of time $T_A$ sufficiently shorter than a Doppler period $T_{DOP}$, integrates N obtained pilot-responses to reduce a power of the AWGN to a factor of 1/N. For this purpose, KN pilot-symbol slots are prepared within period $T_A$, resulting in a remained time to be used for data transmission. As a result, the reduction is a factor that deteriorates frequency-utilization-efficiency of the system. This embodiment is to solve the problem described above.

Figure 14:
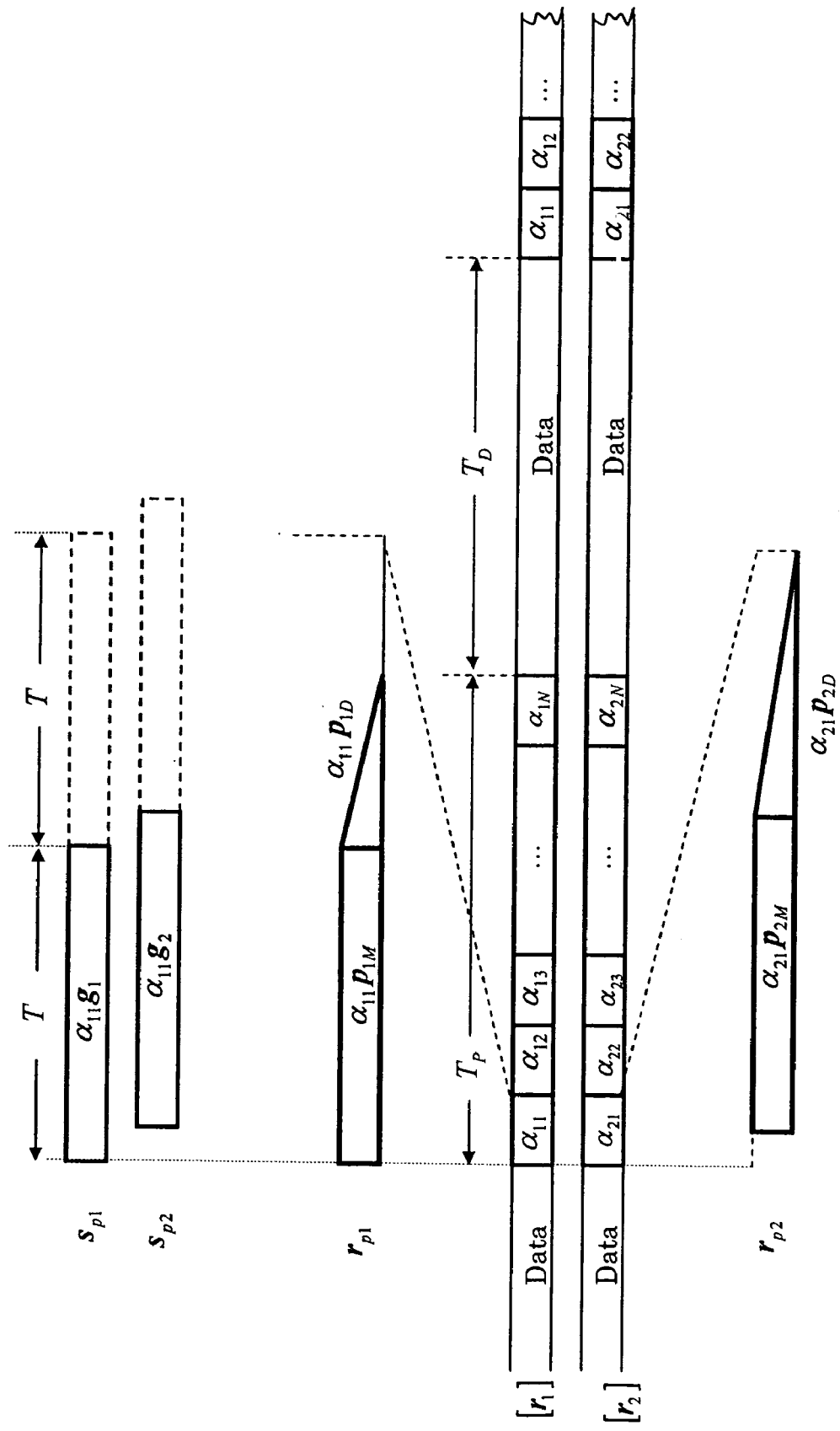
FIG. 14 is a time chart of transmit-/receive-symbol-sequences of an orthogonal sequence modulated pilot transmission system.

FIG. 14 is an auxiliary explanatory diagram of the sixth embodiment of the present invention, showing a time chart of transmit- and receive-pilot-symbol-sequences. On the upper section rows in FIG. 14, the k-th user $u_k$(k=1, 2) transmits a base-band transmit-pilot-symbol $s_{pk}$ with symbol-period T. A subsequent symbol slot is set to be an idle slot as a guard time. (For a delay spread longer than one symbol, more blank slots are required.)

Although the transmit-pilot-symbol $s_{pk}$ has the same configuration as that of the data-symbol, it carries information p=1. User $u_k$ uses $g_k$ as the k-th spreading-sequence with length L, and $\alpha_k=(\alpha_{k1}, \alpha_{k2}, \ldots, \alpha_{kN})^T$ as the kth code-word (orthogonal sequence) of an orthogonal code with length N. The n-th transmit-pilot-symbol is given by:

$$s_{pk}{}^n = p\alpha_{kn}g_k = \alpha_{kn}g_k (p=1) \quad (81)$$

In contrast, a data-symbol is generally composed of $b_k g_k$.)

Thus a transmit-pilot-symbol-sequence (consisting of N pilot-symbols) for user $u_k$ is expressed by:

$$S_{pk}=(s_{pk}{}^1, s_{pk}{}^2, \ldots, s_{pk}{}^N)^T = (\alpha_{k1}g_k, \alpha_{k2}g_k, \ldots \alpha_{kN}g_k)^T \quad (82)$$

The k-th row of an Hadamard matrix having a size of N×N (N≧K) is taken as an example of an orthogonal sequence $\alpha_k$.

The middle and lower rows in FIG. 14 show receive-symbols $r_{pk}$ corresponding to transmit-symbols $s_{pk}$. The base-station controls transmit-timings of respective users so that the receiving positions of all the K symbols of $r_{pk}$ are equal to each other (synchronous reception) or fall within a range of a small timing difference (quasi-synchronous reception). If the delay time of delayed waves is roughly shorter than one-symbol-period (T), a receive-pilot-symbol consisting of a main response $\alpha_{kl}p_{kM}$ and a delayed response $\alpha_{kl}P_{kD}$ occupies within a 2T symbol time-slot. $r_{p2}$ in FIG. 14 shows a case in which a receive-timing is delayed by one chip. When a pilot-symbol-sequence (N pilot-symbols constitute one set) is continuously transmitted (they can be spread between data-symbols), a receive-symbol-sequence with period $T_p$ is illustrated in the lower rows as receive-sequences $[r_1]$, and $[r_2]$ in FIG. 14. Period $T_p$ in the figure takes a time slot put between two adjacent data transmission periods (period $T_D$).

The receiver receives a receive-symbol which is made by multiplexing user specific receive symbol components $r_1$ and $r_2$. The n-th symbol of a receive-pilot-symbol-sequence is generally given by the following equation:

$$r_p(n) = \sum_{k=1}^{K} \alpha_{kn} p_k + x(n) \atop p_k = p_{kM} + p_{kD} \quad (83)$$

where x(n) is an AWGN vector. A receive-response $p_k$ is assumed invariant during pilot period $T_p$. When respective symbols $r_p$(n) of a receive-pilot-symbol sequence $R_p$ are sequentially multiplied by the n-th element of orthogonal sequence $\alpha_k$, the following correlated output, as a pilot-response is obtained.

$$\tilde{p}_k = p_k + \Delta p_k = \frac{1}{N}\left\{\sum_{n=1}^{N} \overline{\alpha_{kn}}r_p(n) + x(n)\right\} \quad (84)$$

This equation results from a property of an orthogonal sequence such as that given by the following equation:

$$\frac{1}{N}\sum_{n=1}^{N} \alpha_{kn}\overline{\alpha_{k'n}} = 1 \quad k = k' \atop = 0 \quad k \neq k' \quad (85)$$

The first term (signal component) of the right-hand side in Eq.(84) has a property of a voltage sum, and the second term (AWGN) has a property of a power sum. Therefore, the S/N ratio of pilot-response $\tilde{p}_k$ is N times larger than the S/N ratio obtained by using only one-pilot-symbol.

Figure 15:
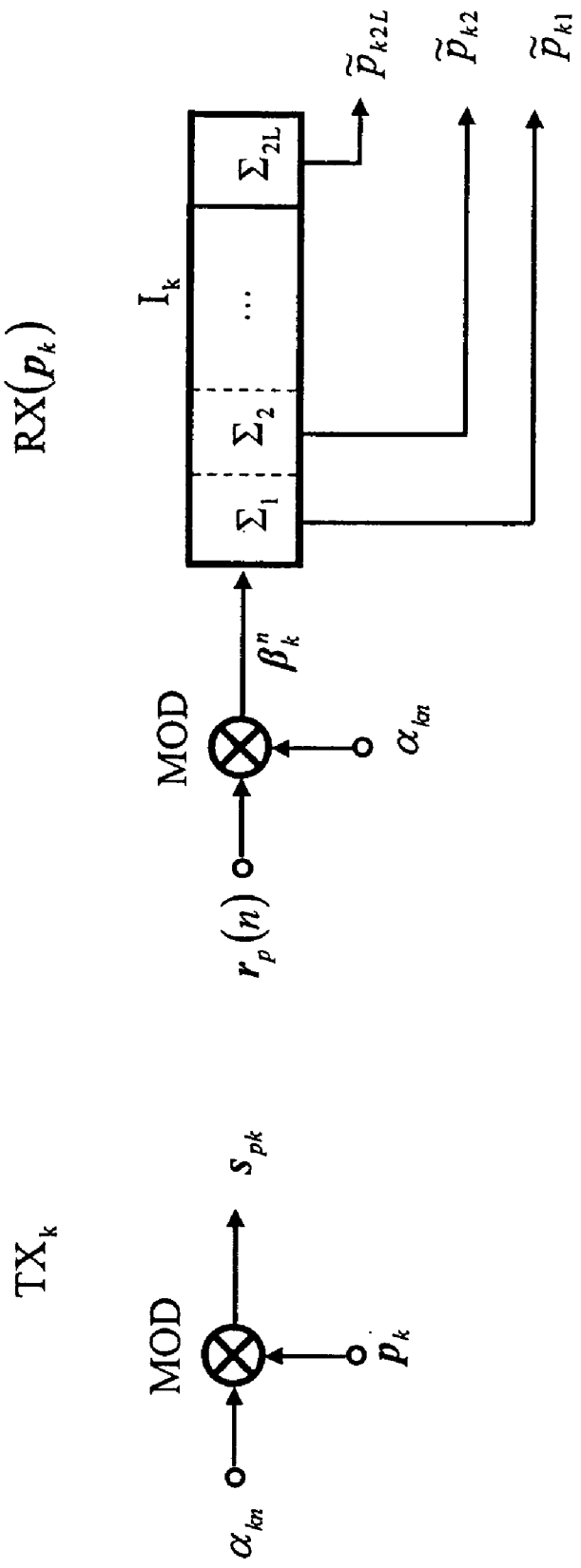
FIG. 15 is a block diagram of a transceiver of the orthogonal sequence modulated pilot transmission system.
Figure 16:
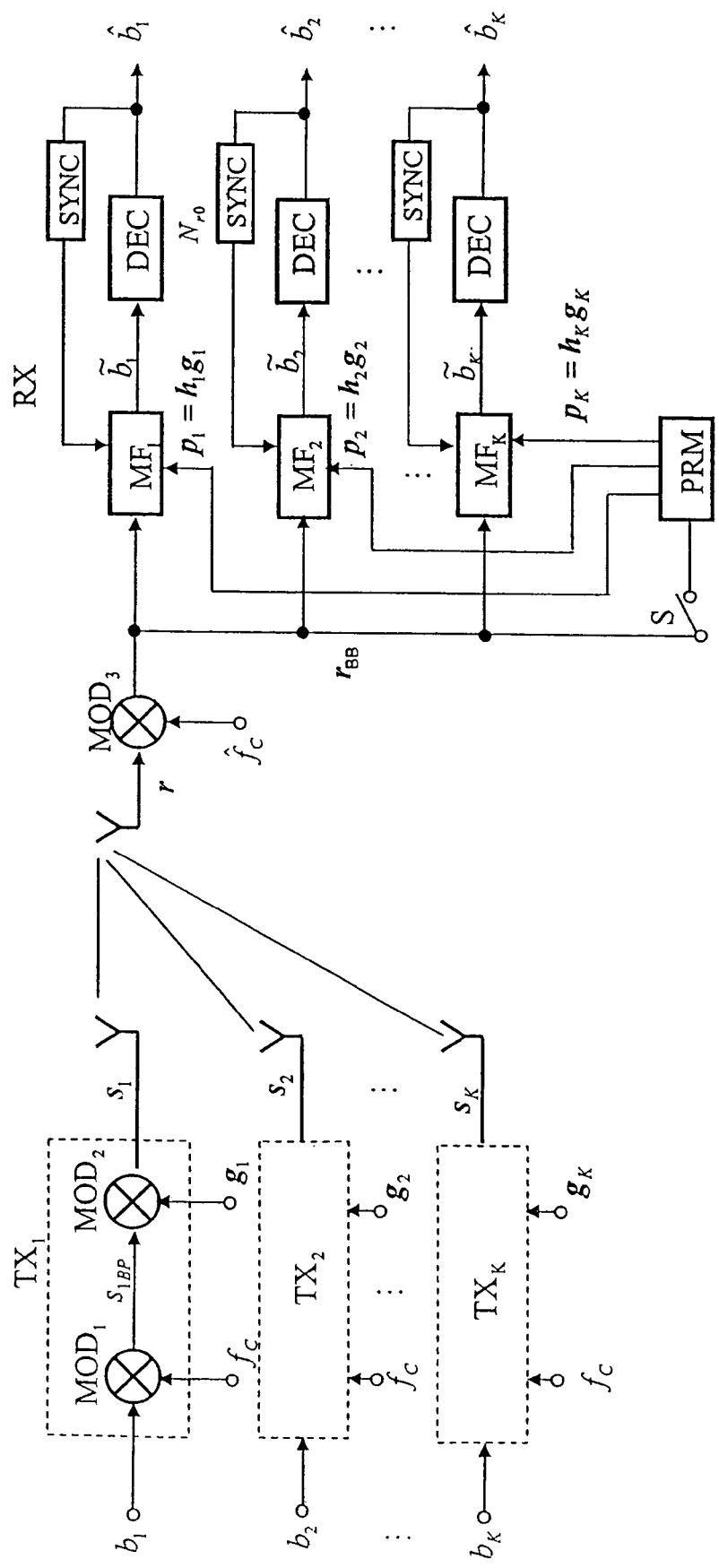
FIG. 16 is a functional block diagram of a transceiver for a conventional CDMA communications system.
Figure 17:
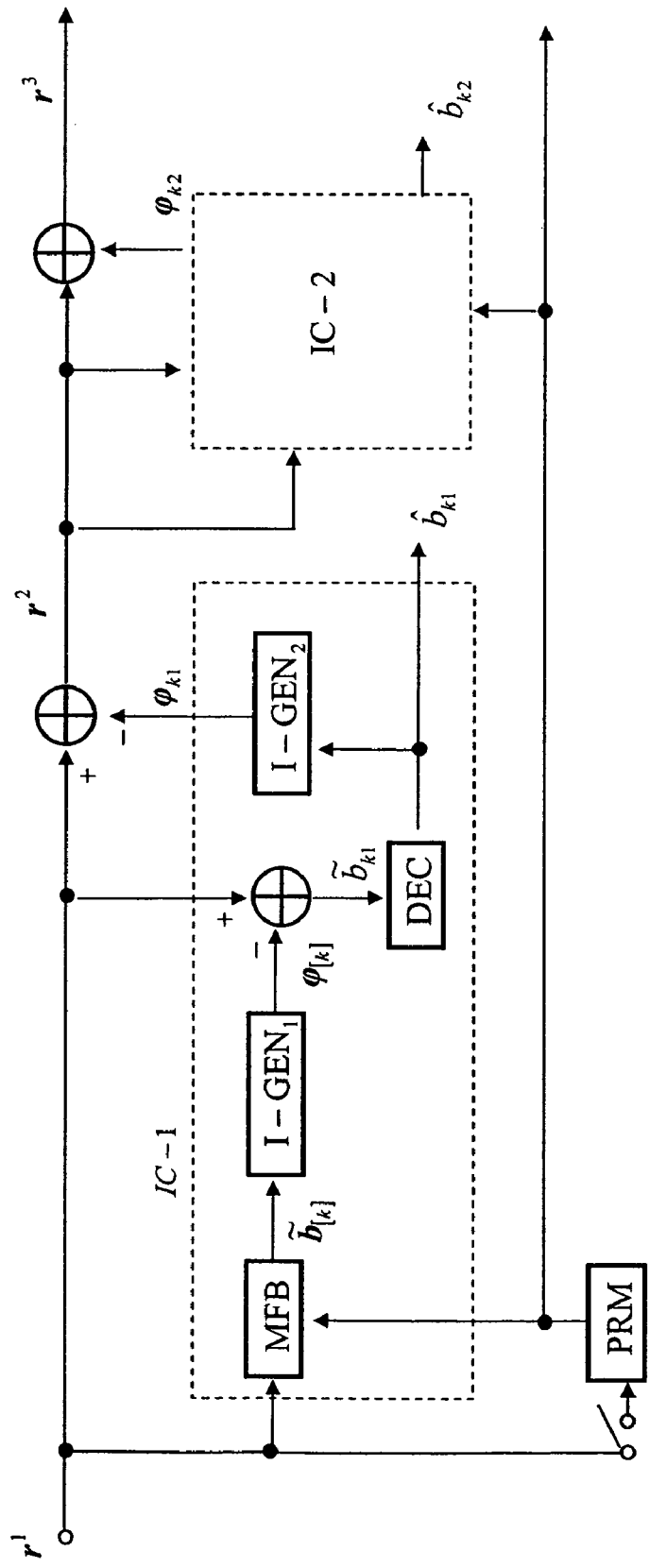
FIG. 17 is a function block diagram of a multi-user receiver (interference canceling system).
Figure 18:
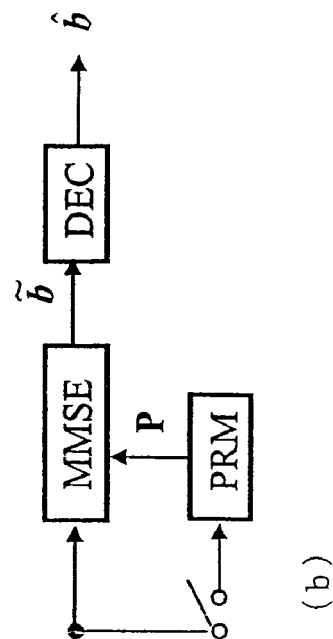
FIG. 18 are functional block diagrams of multi-user receivers (using decorrelating equations), in which FIG. 18(*a*) is a diagram showing a derrelator (DD), FIG. 18(*b*) is a diagram showing a minimum mean square error detector (MMSE-D)
Figure 18:
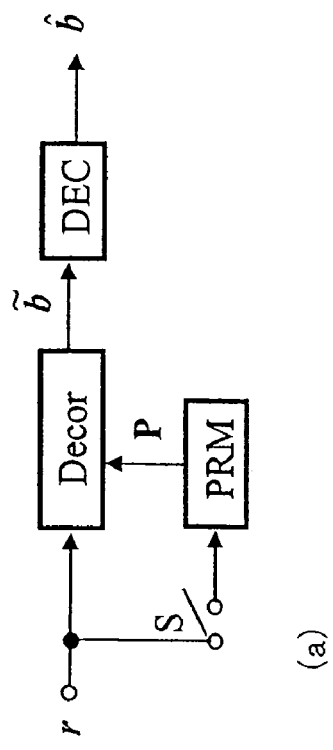
Figure 18:
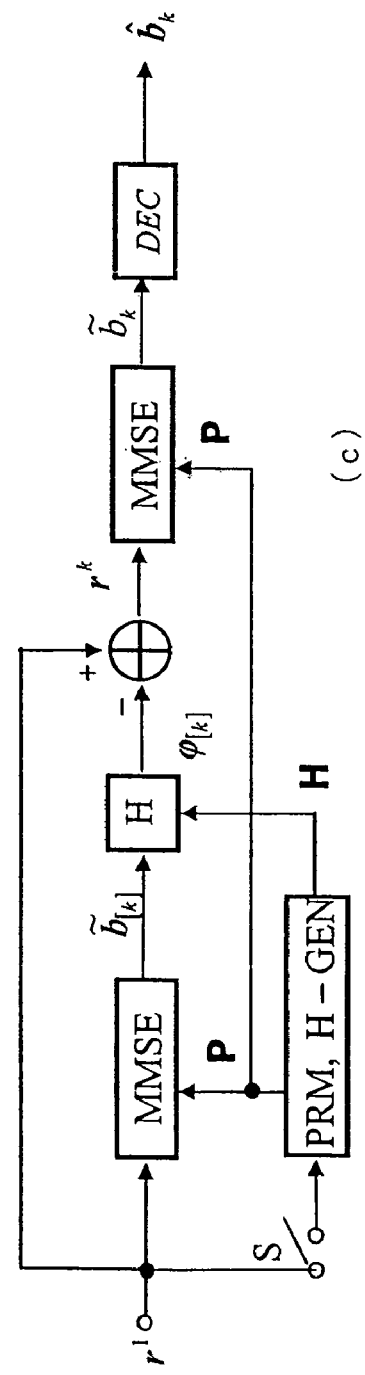

FIG. 15 is a block diagram of an orthogonal sequence modulated pilot transmission system according to the sixth embodiment of the present invention. A transceiver of the k-th user $u_k$ prepares the k-th sequence $\alpha_k$ that is the k-th row of an Hadamard matrix. A transmitter $TX_k$ modulates a spreading-sequence $g_k$ followed by a blank sequence (slot) with the n-th element $\alpha_{kn}$ of sequence $\alpha_k$ to generate a transmit-pilot-symbol $s_{pk}$(n) at a modulator MOD. N transmit-pilot-symbols of $s_{pk}$(n) are sequentially generated and then transmitted. (The carrier-wave modulating device is omitted in FIG. 15.)

In a receiver RX($p_k$) in FIG. 15 a circuit unit used for generating the k-th pilot-response is shown. The receiver receives the n-th receive-pilot-symbol $r_p$(n) with period 2T that is a pilot symbol period. Modulator MOD multiplies the n-th receive pilot symbol $r_p$(n) by the n-th component $\overline{\alpha_{kn}}$ (conjugate of $\alpha_{kn}$) of an orthogonal sequence $\alpha_k$ to produce a multiplied output sequence with 2L chips. The l-th chip-element $\beta_{kl}{}^n$ of each of the multiplied output sequence $\beta_k{}^n$ (=$\beta_{k1}{}^n, \beta_{k2}{}^n, \ldots \beta_{kl}{}^n, \ldots \beta_{k2L}{}^n)^T$ is applied to the l-th integrator $\Sigma^l$ in an integrating bank $I_k$. After N times of the operation is performed (n=1 to N), an integrated value of each integrator is the l-th chip output $\tilde{p}_{kl}$. 2L outputs produced in this method make a pilot-response-vector $\tilde{p}_k$.

In this process manner, pilot period $T_p$=2T×N can be shared by K users, that is equivalent to a pilot period 2T×N×K required for a conventional system. It indicates that a time-slot saving of a factor of 1/K can be achieved. An orthogonal sequence used in the above explanation should have a characteristic such that a 0-shift correlation between any pair of sequences in a set takes a value of 0. Therefore, not only a sequence based on the Hadamard matrix but also the complementary sequence, the ZCZ sequence, and so on can be used.

According to the present invention, the five embodiments can be simultaneously used to construct a system so as to further improve the frequency-utilization-efficiency.

As described above, the invention described in claims 1 and 2 provides techniques of enhancing a user-separating function of a CDMA multi-user receiver using a minimum mean square error detector (MMSE-D) by introducing a correct solution measure directly related to the error powers contained in the respective soft-outputs which are obtained as solutions of a system of linear (de-correlating) equations with a user separating matrix, deciding a soft-output as the least error contaminated soft-output denoted by the best user, repeating the same method sequentially to modified systems of linear equations with reduced sizes to obtain the other user soft-outputs, and producing error reduced soft-outputs for all the users. As a result, it brings an effect of increasing the number of users to be accommodated in a CDMA system and reducing the required transmit-power, resulting in considerable reduction in a power-bandwidth-product PB of the system.

The invention described in claim 3 and 4 provides techniques of enhancing a user-separating function of a CDMA multi-user receiver using a minimum mean square error detector (MMSE-D) by introducing an interference-correcting term which is obtained with a soft-output vector of the 0-th stage (MMSE-D) as the 0-th soft-output vector $\tilde{b}^0$ by assuming the vector to be of an errorless, producing another soft-out vector of the first stage MMSE-D as the first soft-output vector by adding the interference-correcting term to the 0-th soft-output vector, repeating a predetermined number of times the production of respective correcting terms and respective new soft-output vectors sequentially to produce a final soft-output vector with considerably reduced interference error components. Conventional MMSE systems with an interference compensating function have used an estimated interference disturbing one user of interest, which is obtained by estimated data-components of the other users, resulting in negligence of all the user components. For this reason, the improving effect of the conventional MMSE systems is very limited. The present invention brings an effect of increasing the number of users to be accommodated in a CDMA system and reducing the required transmit-power, resulting in considerable reduction in a power-bandwidth-product PB of the system.

The invention described in claims 5 and 12 provides techniques of reducing the required transmit-symbol-energy, by replacing each of the user specific pilot-response-vectors with a pair of synthesized pilot-response vectors which constitutes a pilot-response-matrix, establishing a system of linear equations with a user separating matrix composed of the pilot-response-matrix to avoid ISI (inter-symbol-interference), solving the system to produce a soft-output vector, deciding a current detected data-vector of a data symbol over a present symbol period, and generating transmit-data estimated by using a plurality of soft-output vectors of data symbols over present and adjacent symbol periods. Conventional multi-user receivers use guard sequence added envelope sequences to avoid ISI. However, as the data-rate increases, the delayed wave spread increases, resulting in that the guard sequence energy takes a dominant factor of symbol energy so as to lose the power efficiency. As a result, the present invention can achieve a required error rate with a low transmit-power even for a high data-rate transmission, resulting in considerable improvement in a power-bandwidth-product PB of the system.

The invention described in claims 6 and 7 provides techniques of increasing the number of users and reducing the error-rate by realizing a complete user-separating function and a data-separating function for a plurality of data symbols using plurality of space-time slots received at a receiver with an MIMO system, composing a user-separating matrix with user specific pilot response vector obtained via respective receive-antennae, and establishing a system of linear equations with the user separating matrix. In contrast to a frequency-utilization-efficiency of a conventional space-time coded transmission system with no user separation function, the present invention provides not only an increase in user population larger than the spreading factor, but also reducing the required transmit-power because of the diversity effect and an interleaving function. As a result, it brings an effect of increasing the number of users to be accommodated in a CDMA system and reducing the required transmit-power, resulting in considerable reduction in a power-bandwidth-product PB of the system.

The invention described in claim 8 provides a technique to reduce considerably the transmit-power of a CDMA system by preparing a spreading sequence set whose member-sequence is made by shifting, by mutually different chips, a sequence belonging to a complementary sequence set or a zero correlation zone sequence set, allocating respective of the member-sequences to respective users as spreading-sequences, controlling the transmit-timing so that a receiver receives a receive-symbol under a synchronous or quasi-synchronous condition, analyzing the receive symbol with a system of linear equations with a user separation matrix having a high regularity due to the orthogonality of the member-sequences, and producing a soft-output vector without being disturbed by interfering noise and delayed waves. The techniques of claim 1 or 3 help reducing the error contained in the soft-outputs. As a result, in comparison with a conventional system in which each user producing a synthesized transmit-symbol made by adding multiple member-sequences, each conveying a data, present invention can considerably reduce the transmitter power while keeping almost the same frequency-utilization-efficiency.

The invention described in claim 9 provides a means for transmitting pilot symbols so that a receiver may obtain accurate pilot responses to identify the channels by allocating the k-th row of an Hadamard matrix as the k-th sequence to the k-th user, setting common pilot time slots where respective user-transmitters send out a pilot symbol sequence modulated by the k-th sequence, by using the same time zone and the same frequency band, so that the receiver effectively may utilize a time and a band occupied by all the pilot-symbol-sequences to separate perfectly respective user specific pilot responses. In order to have a correct pilot-response, conventional systems have utilized a transmission resource independently allocated for each user's pilot transmission, resulting in a considerable loss of the frequency-utilization-efficiency of the system. However, by adding the present invention to systems constructed based on the invention of claims 1 to 8, these systems can indicate an effect of further improving a power-bandwidth-product PB of the system.

The invention described in claim 10 provide a technique to simplify the systems equipped with an MMSE-D using a decorrelating detector (DD) in place of the MMSE-D described in claims 1 to 4. The present invention can indicate an excellent performance almost equal to that of the systems with MMSE-D by reducing the number of users to be accommodated by a small percentage.

The invention described in claim 11 provides techniques of increasing the number of users to be accommodated by introducing a concatenated receive-symbol-vector and a concatenated pilot-response-vector to a receiver of an MIMO system to increase the number of dimensions of a symbol to be analyzed, and to reduce the noise included in the soft-outputs. As a result, the present invention has an effect of considerably improve a power-bandwidth-product PB of the system.

The inventions described in claims 1 to 4 or claim 10 provides techniques of solving a general system of linear equations with multiple unknowns with an MMSE-D or a DD without being adversely affected by white noise and interference contained in an input vector. Therefore, these inventions can be applied to not only multi-user CDMA receivers described as examples, but also a tap coefficient control of channel equalizers. The inventions are widely applied for systems which need to solve a system of linear equations with multiple unknowns such as used for the field of communications, automatic control, and so on.

The invention claimed is:

1. A de-correlating discrimination system of code division multiple access signals, wherein a basic system structure is composed of plurality of cells, each of said plurality of cells comprises a base-station and K user-stations, each of the user-stations including a user transmitter and a user receiver, communicating through a multi-access-channel with the base-station which includes a base-station receiver and a base-station transmitter, and said user transmitter is capable of transmitting a data symbol to convey a data with a spreading sequence, and a pilot-symbol that is said spreading sequence to identify a channel from said user transmitter to said base-station receiver, and said base-station receiver includes a minimum mean square error detector to analyze an input vector, that is a receive-symbol containing multiple user specific data responses, each having conveyed a transmit-data through a channel, by solving a system of linear equations made for said input vector, composed of an unknown data vector and a user separating matrix U which consists of a pilot matrix P with all K user pilot responses associated with said channels, and a white noise power multiplied identity matrix, characterized in that said receiver comprises:

means for solving a system of equations as identified by the first system of de-correlating equations with a user separating matrix $U^0$ to produce a soft-output vector $\tilde{b}^0$ at an analyzing circuit, means for producing power of respective user-corresponding noise evaluation vectors of a noise evaluation matrix C generated by a matrix inverse of the user-separating matrix $U^0$ as a correct solution measure $P_C^0$ consisting of K components at a power estimator, means for deciding one soft-output component $\tilde{b}_{k'}^0$ of said soft-output-vector $\tilde{b}^0$ as the first best user $u_{k'}$ based on one of the minimum candidate components of said correct solution measure $P_C^0$ at a best user decision circuit, means for making a hard decision on said soft-output $\tilde{b}_{k'}^0$ to obtain a detected value $\hat{b}_{k'}^0$ at a decision circuit, means for recognizing unknown data and pilot response corresponding to the first best user as redundant components for further analyzing process, means for removing said redundant components corresponding to the first best user $u_{k'}$ from the first system of de-correlating equations with said user separating matrix $U^0$ with circuits of a modulator, a subtractor, and a best user remover to generate a system of equations as identified by the second system of de-correlating equations with a user separating matrix $U^1$, means for solving said second system to produce a soft-output vector $\tilde{b}^1$, producing a variance of user-corresponding noise evaluation vectors of a noise evaluation matrix C generated by a matrix inverse of said user separating matrix $U^1$ as a correct solution measure $P_C^1$ consisting of (K−1) components, and deciding one output $\tilde{b}_{k''}^1$ of the soft-outputs of said soft-output-vector $\tilde{b}^1$ as the second best user $u_{k''}$ based on one of the minimum candidate components of said correct solution measure $P_C^1$, means for making a hard decision on said soft-output $\tilde{b}_{k''}^1$ to obtain a detected value $\hat{b}_{k''}^1$, means for sequentially repeating the same method as that applied to the second system of de-correlating equations to the following systems of de-correlating equations, to decide the following best users, thereby producing said best users in turn, and means for making hard decision on respective soft-outputs of said best users to obtain detected values of transmit-data all the users have sent out at said decision circuit.

2. A discrimination system of code division multiple access signals, wherein a basic system structure is composed of plurality of cells, each of said plurality of cells comprises a base-station and K user-stations, each of the user-stations including a user transmitter and a user receiver, communicating through a multi-access-channel with the base-station which includes a base-station receiver and a base-station transmitter, and said user transmitter is capable of transmitting a data symbol to convey a data with a spreading sequence, and a pilot-symbol that is said spreading sequence to identify a channel from said user transmitter to said base-station receiver, and said base-station receiver includes a minimum means square error detector to analyze an input vector, that is a receive-symbol containing multiple user specific data responses, each having conveyed a transmit-date through a channel, by solving a system of linear equations made for said input vector, composed of an unknown data vector, and a user separating matrix U which consists of a matrix P with all K user pilot responses associated with said channels, and a white noise power multiplied identity matrix, wherein said receiver comprises:

means for solving a system of equations as identified by a first system of de-correlating equations with a user separating matrix $U^0$ to produce a soft-output vector $\tilde{b}^0$ at an analyzing circuit, means for producing power of respective user-corresponding noise evaluation vectors of a noise evaluation matrix C generated by a matrix inverse of the user-separating matrix $U^0$ as a correct solution measure $P_C^0$ consisting of K components at a power estimator, characterized in that said receiver comprises:

means for solving a system of equations as identified by the first system of de-correlating equations with a user separating matrix $U^0$ to produce a soft-output vector $\tilde{b}^0$ at an analyzing circuit, means for producing said power of respective user-corresponding noise evaluation vectors $P_C^0$ consisting of K components at a power estimator, obtaining input noise power $N_{r0}$ at a noise power estimator, and calculating a standard deviation $\sigma^0$ to compose an error amplitude distribution with said variance $P_C^0$ and said input noise power $N_{r0}$, means for obtaining a ratio identified by the 0th normalized probability ratio $\lambda^0$ of K components, each being calculated based on an error distribution model with said standard deviation $\sigma^0$ and respective of the K components of said soft-output vector $\tilde{b}^0$, means for deciding one soft-output component $\tilde{b}_{k'}^0$ of said soft-output-vector $\tilde{b}^0$ as the first best user $u_{k'}$ based on one of the maximum candidate components of normalized probability ratio $\lambda^0$ at a best user decision circuit, means for making a hard decision on said soft-output $\tilde{b}_{k'}^0$ to obtain a detected value $\hat{b}_{k'}^0$ at a decision circuit, means for recognizing unknown data and pilot response corresponding to the first best user as redundant components for further analyzing process, means for removing said redundant components corresponding to the first best user $U_{k'}$ from the first system of de-correlating equations with said user separating matrix $U^0$ with circuits of a modulator, a substractor, and a best user remover to generate a system of equations as identified by the second system of de-correlating equations with a user separating matrix $U^1$, means for sequentially repeating the same method as that applied to the first system of de-correlating equations to the following systems of de-correlating equations, and means for making hard decision on soft-outputs of said best users to obtain detected values of transmit-data all the users have sent out at said decision circuit.

3. A de-correlating discrimination system of code division multiple access signals, wherein a basic system structure is composed of plurality of cells, each of said plurality of cells comprises a base-station and K user-stations, each of the user-stations including a user transmitter and a user receiver, communicating through a multi-access-channel with the base-station in the cell which includes a base-station receiver and a base-station transmitter, and a user transmitter is capable of transmitting a data symbol to convey a data with a spreading sequence, and a pilot-symbol that is said spreading sequence to identify a channel from said user transmitter to said base-station receiver, and said base-station receiver includes a minimum mean square error detector to analyze an input vector, that is a receive-symbol containing multiple user specific data responses, each having conveyed a transmit-data through a channel, by solving a system of linear equations made for said input vector, composed of an unknown data vector and a user separating matrix U which consists of a pilot matrix P with all K user pilot responses associated with said channels, and a white noise power multiplied identity matrix, characterized in that said receiver comprises:

means for solving a first system of de-correlating equations with said user separating matrix U to produce a soft-output vector $b^0$ identified by the 0-th soft-output vector at an analyzing circuit, means for multiplying the 0th soft-output-vector $b^0$ by a matrix inverse of said user-separating matrix U to calculate an interference-correcting vector $c^0$ identified by the 0-th interference-correcting vector at an interference generator, and adding the 0-th interference-correcting vector $c^0$ to the 0-th soft-output-vector $b^0$ to produce a soft-output-vector $b^1$ identified by the first soft-output-vector, means for applying the same method to calculate an interference-correcting vector $c^1$ identified by the first interference-correcting vector using the first soft-output-vector $b^1$ as that used for calculating 0-th interference-correcting vector $c^0$, means for n times repeating the same method to calculate the (n−1)-th interference-correcting vector $c^{(n-1)}$ using the (n−1)-th soft-output-vector $b^{(n-1)}$ and said user separating matrix U, as that used to calculate the first interference-correcting vector $c^1$ at said interference generator, and to add the (n−1)-th interference-correcting vector $c^{(n-1)}$ to the (n−1)-th soft-output-vector $b^{(n-1)}$ to produce the n-th soft-output-vector $b^n$, and means for making hard decisions on respective soft-output components of the n-th soft-output-vector $b^n$ to obtain detected values of transmit-data all the users have sent out at said decision circuit.

4. A de-correlating discrimination system of code division multiple access signals, according to claim 3, characterized in that said receiver comprises:

means for introducing a coefficient $\lambda_N$ to increase an amplitude of the identity matrix, used in the user-separating matrix U, and producing a system of de-correlating equations with a user-separating matrix U modified by said coefficient $\lambda_N$, means for limiting the amplitude of the 0th soft-output-vector $b^0$ to produce a vector identified as the 0th modified soft-output vector $b^{L0}$, and generating an interference-power-estimated coefficient θ based on an average power ratio of larger absolute amplitude components in the 0th soft-output-vector $b^0$ to smaller absolute amplitude components in the 0th soft-output-vector $b^0$, means for making a product of an interference-estimate-coefficient θ, a matrix inverse of the user-separating matrix U, said coefficient $\lambda_N$ said white noise power, and said modified soft-output vector $b^{L0}$ to produce, a modified interference correcting vector $c^0$ identified as 0th modified interference correcting vector, means for producing the first soft-output-vector $b^1$ by adding the 0-th modified interference-correcting-vector $c^0$ to the 0-th modified soft-output-vector $b^0$ at the first stage, means for repeatedly applying the same method to the following of solving said system of de-correlating equations with a user-separating matrix U modified by said coefficient λN and producing the n-th soft-output-vector $b^n$ at the n-th stage, as that used to obtain the first soft-output-vector $b^1$ based on the 0-th modified interference-correcting-vector $c^0$ and the 0-th modified soft-output-vector $b^{L0}$ at the first stage, and means for making hard decisions on respective of soft-output components of the n-th soft-output $b^n$ to obtain detected values of transmit-data all the users have sent out at said decision circuit.

5. A de-correlating discrimination system of code division multiple access signals, according to claim 1, characterized in that said receiver comprises:

means for receiving pilot-response-vectors received from respective user transmitters and separating each of them as a main response of a current pilot-symbol arrived on a target symbol-period and delayed wave responses of preceding pilot-symbols arrived on the same target symbol-period, and producing a pilot-response-set for each user, consisting of synthesized pilot-responses made by taking an algebraic sum of said main response and said delayed wave responses, and means for generating a pilot-response-matrix P composed of said synthesized pilot-responses of all the users, generating a system of de-correlating equations with a user-separating matrix U made by said pilot-response-matrix P and an identity matrix, an unknown data-vector b, and receive-symbol-vector r as constituent elements, and solving said system to obtain a soft-output-vector.

6. A de-correlating discrimination system of code division multiple access signals, according to claim 1, characterized in that, said basic system comprising:

means for including a multiple-input multiple-output system in which a plurality of antennae are arranged to perform communications, each of said user transmitters comprising:

means for allocating a plurality ($N_d$) of transmit-data to $N_\tau N$ symbols on a space-time transmit-axis constituted by a plurality ($N_\tau$) time slots and a plurality (N) of transmit-antennae, and transmitting $N_\tau N$ symbols over $N_\tau$ symbol periods, and said base-station receiver comprising:

means for receiving symbols over $N_\tau$ symbol slots at a plurality (M) of antennae, storing a pilot-response $P_{d\tau nm}^{k}$ of a pilot-symbol received at the m-th receive-antenna when the k-th user transmitter sends d-th transmit-pilot-symbol of $N_d$ symbols over the τ-th symbol-slot of $N_\tau$ symbol-slots, generating a concatenated pilot-response-vector $P_d^k$ made by concatenating only pilot-responses $P_{d\tau nm}^{k}$ corresponding to the d-th pilot-responses with respect to antenna number m and time-sequence numbers τ, generating a pilot-response-matrix P consisting of these vectors, and generating a concatenated receive-vector r made by concatenating of M pieces of receive-symbol-vectors received on the $N_\tau$ symbol slots, means for generating a system of de-correlating equations with a user-separating matrix U generated from the pilot-response-matrix P and an identity matrix, the concatenated receive-vector r, and an unknown-data-vector b, and means for solving said system of de-correlating equations to obtain a soft-output vector $\tilde{b}$ of the transmit-data-vector b, and making $\tilde{b}$ hard decisions on respective components of the soft-output-vector $\tilde{b}$ to obtain a detected data vector $\hat{b}$.

7. A de-correlating discrimination system of code division multiple access signals, according to claim 1, wherein said basic system comprising:

means for including a multiple-input multiple-output system in which a plurality of antennae are arranged to perform communications, each of said user transmitters comprising:

means for allocating a plurality ($N_d$) of transmit-data to $N_\tau N$ symbols on a space-time transmit-axis constituted by a plurality ($N_\tau$) time slots and a plurality (N) of transmit-antennae, and transmitting $N_\tau N$ symbols over $N_\tau$ symbol periods, and said base-station receiver comprising:

means for receiving symbols over $N_\tau$ symbol slots at a plurality (M) of antennae, storing a pilot-response $P_{d\tau nm}^{k}$ of a pilot-symbol received at the m-th receive-antenna when the k-th user transmitter sends d-th transmit-pilot-symbol of $N_d$ symbols over the τ-th symbol-slot of $N_\tau$ symbol-slots, generating a concatenated pilot-response-vector $P_d^k$ made by concatenating only pilot-responses $P_{d\tau nm}^{k}$ corresponding to the d-th pilot-responses with respect to antenna number m and time-sequence numbers τ, generating a pilot-response-matrix P consisting of these vectors, and generating a concatenated receive-vector r made by concatenating of M pieces of receive-symbol-vectors received on the $N_\tau$ symbol slots, means for generating a system of de-correlating equations with a user-separating matrix U generated from the pilot-response-matrix P and an identity matrix, the concatenated receive-vector r, and an unknown-data-vector b, and means for solving said system of de-correlating equations according to claim 1 to obtain a soft-output $\tilde{b}$ of the transmit-data-vector b, and making $\tilde{b}$ hard decisions on respective components of the soft-output-vector $\tilde{b}$ to obtain a detected data vector $\hat{b}$, characterized in that each of said user transmitters comprises:

means for interleaving in advance a time sequence of N transmit-symbols where N is the number of transmit-antennae, and transmitting interleaved symbols over $N_\tau$ times, and said receiver comprises:

means for performing de-interleaving M pieces of receive-symbols where M is equal to the number of receive-antennae, and means for generating a system of de-correlating equations for each of $N_\tau$ symbol sets made by de-interleaved outputs, solving the system to obtain a soft-output-vector $\tilde{b}$ of a transmit-data-vector b, and making hard decisions on respective elements of the soft-output-vector $\tilde{b}$ to obtain a detected data-vector $\hat{b}$.

8. A de-correlating discrimination system of code division multiple access signals according to claim 1, wherein a basic system structure is composed of plurality of cells, each of said plurality of cells comprises a base-station and K user-stations, each of the user-stations including a user transmitter and a user receiver, communicating through a multi-access-channel with the base-station which includes a base-station receiver and a base-station transmitter, and characterized in that said user transmitter comprises:

means for transmitting a data symbol to convey a data with a spreading sequence, and a pilot-symbol that is said spreading sequence to identify a channel from said user transmitter to said base-station receiver, means for generating an enveloped cyclically shifted spreading-sequence made by adding guard sequences to a core-spreading-sequence which belongs to a k-shift sequence of one pair of complete complementary spreading-sequences or a k-shift sequence of a zero correlation zone spreading-sequence as said core-spreading-sequence, means for controlling the transmit-timing so that all of user specific receive-symbol components may arrive at said base-station receiver under a synchronous or quasi-synchronous condition, and said receiver comprises:

means for extracting a core-period-part of the receive-symbol as an input vector, and analyzing it with a minimum mean square detector.

9. A de-correlating discrimination system of code division multiple access signals, according to claim 1, characterized in that a user transmitter identified by the k-th user transmitter of K user transmitters comprises;

means for generating a pilot-symbol with a guard added spreading-sequence, and preparing a pilot-symbol-sequence consisting of N symbols modulated by the k-th code-word with a code length N in an orthogonal code and transmitting said pilot-symbol-sequence so that it may arrive at the receiver together with other pilot-symbol-sequences sent out by the other user-stations under a synchronous or quasi-synchronous condition, and said base-station receiver comprises:

means for receiving a pilot-response-sequence multiplexed by all of user specific pilot-responses, and applying said pilot-response-sequence to a matched filter matched to the k-th orthogonal code-word to generate a pilot-response-vector of the k-th user, and means for producing a pilot-response-matrix P composed of pilot-response-vectors of all the K users to establish a system of de-correlating equations.

10. A de-correlating discrimination system of code division multiple access signals, according to claim 1, characterized in that said receiver comprises:
means for solving a system of equations as identified by the first system of de-correlating equations with a de-correlating detector which is made by removing an identity matrix I from a user separating matrix U used in said minimum mean square error detector, and
means for solving said following systems of de-correlating equations with de-correlating detectors.

11. A de-correlating discrimination system of code division multiple access signals, according to claim 1, wherein said basic system comprising:
means for including a multiple-input multiple-output system in which a plurality of antennae are arranged to perform communications,
each of said user transmitters comprising:
means for transmitting a data symbol to convey a data with a spreading sequence, and a pilot-symbol that is said spreading sequence to identify a channel from said user transmitter to said base-station receiver, and
said base-station receiver comprising:
means for receiving symbols over $N_\tau$ symbol slots at a plurality (M) of antennae, and
characterized in that said receiver comprising:
means for receiving M pieces of pilot-response-vectors per user obtained through M pieces of said antennae, generating an extended pilot-response-vector by concatenating said pilot-response-vectors and generating a pilot-response-matrix P by composing extended pilot-response-vectors obtained for all the users, and
means for generating an extended receive-vector r by concatenating all of the receive-symbols through M pieces of said antennae, establishing a system of de-correlating equations with a user separating matrix U made by said pilot-response-matrix P and solving said system to obtain a soft-output vector.

12. A de-correlating discrimination system of code division multiple access signals, according to claim 1,
wherein said receiver comprising:
means for receiving pilot-response-vectors received from respective user transmitters and separating each of them as a main response of a current pilot-symbol arrived on a target symbol-period and delayed wave responses of preceding pilot-symbols arrived on the same target symbol-period, and producing a pilot-response-set for each user, consisting of synthesized pilot-responses made by taking an algebraic sum of said main response and said delayed wave responses,
means for generating a pilot-response-matrix P composed of said synthesized pilot-responses of all the users, generating a system of de-correlating equations with a user-separating matrix U made by said pilot-response-matrix P and an identity matrix, an unknown data-vector b, and receive-symbol-vector r as constituent elements, and solving said system according to a method of claim 1 to obtain a soft-output-vector,
means for generating a data and a pilot-symbols with an extended sequence which is produced by adding an imitating delayed sequence to a core-spreading-sequence, so that the imitating delayed sequence is arranged outside the tail of a transmit-symbol-period that is the same time-slot as the core-spreading-sequence, and transmitting the data and the pilot-symbols so that a component corresponding to the imitating delayed sequence takes a time position overlapping a front portion of a subsequent symbol, transmitting a data-symbol and a pilot-symbol, and
said receiver comprises:
means for obtaining a receive-data-symbol and K user pilot-responses, and establishing a system of de-correlating equations with a user separating matrix or a pilot-response-matrix having an enhanced regularity, produced based on said receive data symbol and K user pilot-responses, and
means for solving said system,
characterized in that each of said user transmitters comprises:
means for generating a data and a pilot symbols with an extended sequence which is produced by adding an imitating delayed sequence to a core-spreading-sequence, so that the imitating delayed sequence is arranged outside the tail of a transmit-symbol-period that is the same time-slot as the core-spreading-sequence, and transmitting the data and the pilot-symbols so that a component corresponding to the imitating delayed sequence takes a time position overlapping a front portion of a subsequent symbol subsequently transmitting a data-symbol and a pilot-symbol, and
said receiver comprises:
means for obtaining a receive-data-symbol and K user pilot-responses, and establishing a system of de-correlating equations with a user separating matrix comprising a pilot-response-matrix having an enhanced regularity, receive data symbols and K user pilot-responses.

* * * * *